(12) United States Patent
Ishioka

(10) Patent No.: US 6,912,243 B1
(45) Date of Patent: Jun. 28, 2005

(54) SPREAD SPECTRUM RECEIVER AND SPREAD SPECTRUM RECEIVING METHOD

(75) Inventor: Kazuaki Ishioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 675 days.

(21) Appl. No.: 09/926,124

(22) PCT Filed: Jun. 6, 2000

(86) PCT No.: PCT/JP00/03661

§ 371 (c)(1),
(2), (4) Date: Sep. 6, 2001

(87) PCT Pub. No.: WO01/54294

PCT Pub. Date: Jul. 26, 2001

(30) Foreign Application Priority Data

Jan. 19, 2000 (JP) .......................... 2000-010410

(51) Int. Cl.[7] .............................. H04B 1/69
(52) U.S. Cl. .............. 375/147; 375/150; 370/335
(58) Field of Search ................ 375/130, 147, 375/150, 152; 370/335, 342

(56) References Cited

U.S. PATENT DOCUMENTS

| | | |
|---|---|---|
| 5,812,593 A | 9/1998 | Kaku |
| 5,974,038 A * | 10/1999 | Shou et al. .................. 370/335 |
| 2001/0050950 A1 * | 12/2001 | Sato ........................ 375/150 |

FOREIGN PATENT DOCUMENTS

| | | |
|---|---|---|
| EP | 0 718 9 98 | 6/1996 |
| EP | 0 951 148 | 10/1999 |
| EP | 0 969 603 | 1/2000 |
| EP | 0 984 576 | 3/2000 |
| EP | 0 989 685 | 3/2000 |
| JP | 8-181636 | 7/1996 |
| JP | 10-308688 | 11/1998 |
| JP | 10-336072 | 12/1998 |
| JP | 11-186991 | 7/1999 |
| JP | 11-298401 | 10/1999 |
| JP | 2000-78110 | 3/2000 |
| JP | 2000-115022 | 4/2000 |
| JP | 2000-134135 | 5/2000 |
| WO | WO 99/63677 | 12/1999 |

OTHER PUBLICATIONS

U.S. Appl. No. 09/696,180, filed Oct. 26, 2000, Pending.
U.S. Appl. No. 09/926,124, filed Sep. 06, 2001, Pending.

* cited by examiner

Primary Examiner—Temesghen Ghebretinsae
(74) Attorney, Agent, or Firm—Oblon, Spivak, McClelland, Maier & Neustadt, P.C.

(57) ABSTRACT

The spread spectrum reception apparatus is provided with a RAKE-combination path timing detector which detects a first path using a delay profile produced with a correlation electric power value with improved signal-to-electric power ration by performing cyclic integration of electric power, detects a second path based on the corrected delay profile by correcting a correlation electric power value of the delay profile using a correction coefficient corresponding to a deviation of delay time of the first path signal. A correction coefficient storing unit stores correction coefficient pre-calculated giving consideration to time correlation of interference and thermal noise.

7 Claims, 16 Drawing Sheets

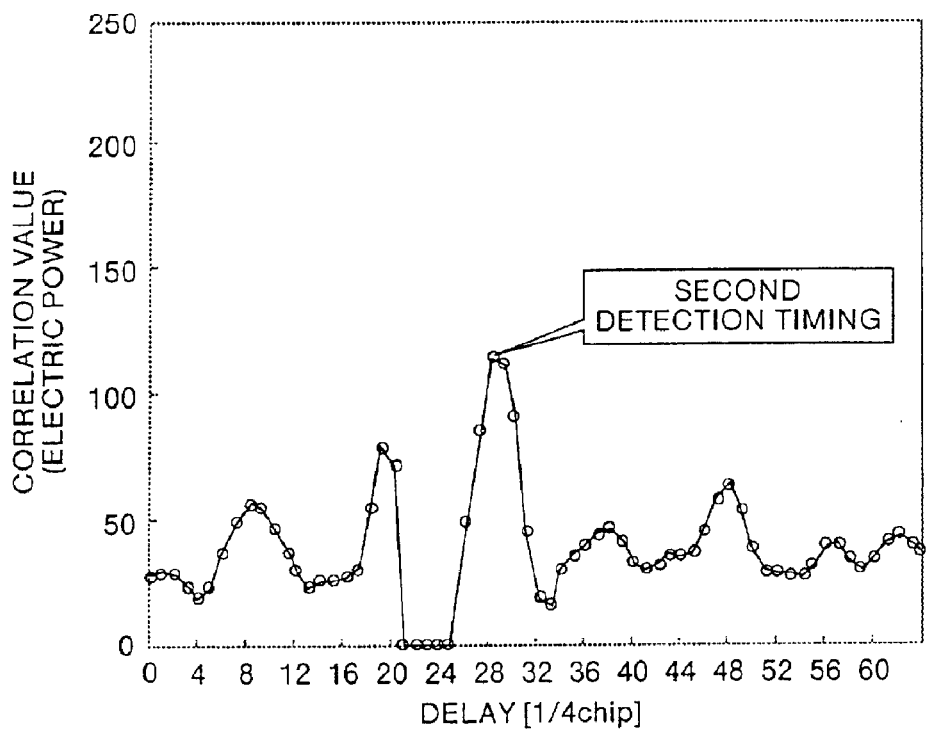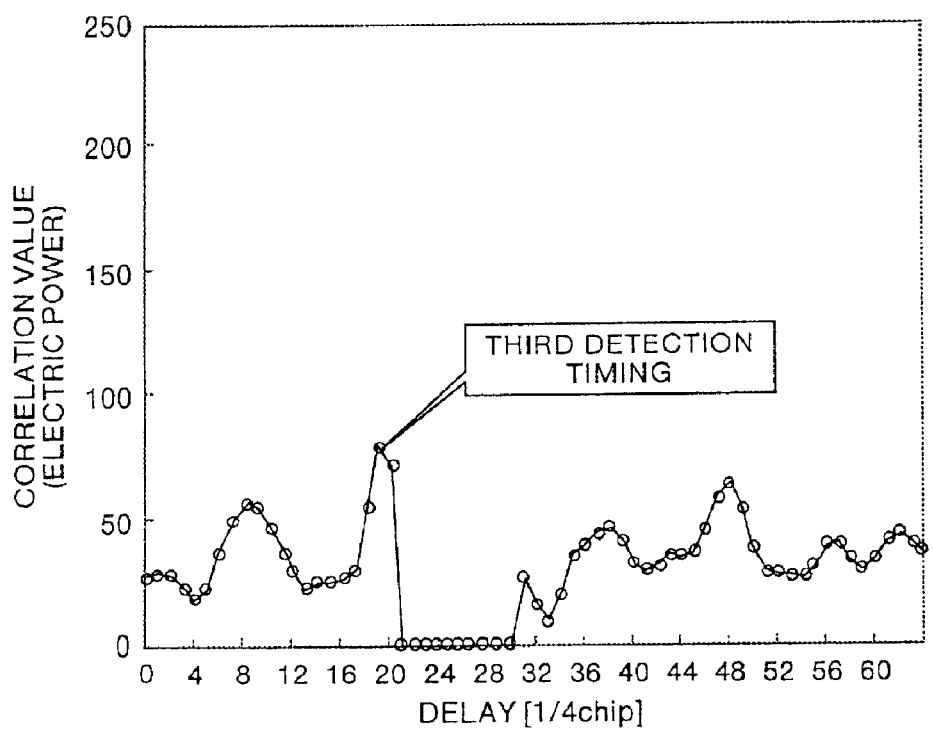

SPREAD SPECTRUM RECEIVER AND SPREAD SPECTRUM RECEIVING METHOD

TECHNICAL FIELD

The present invention relates to a spread spectrum reception apparatus. More particularly, this invention relates to detection of RAKE-combination signal for detecting a signal proper for the RARE-combination.

BACKGROUND ART

When transmitting an information signal, a spread spectrum reception apparatus which performs communication using DS-CDMA (Direct Sequence CDMA) system operates as follows. That is, it applies a first modulation such as QPSK to the information signal and thereafter spread-modulates the information signal with a spread code such as PN sequence to transmit it. When receiving such a spread spectrum signal, the spread spectrum reception apparatus at a reception side as follows. That is, it calculates a correlation value between a received spread spectrum signal and a predetermined spread code to detect a synchronization phase of spread code. Thereafter, it produces an inverse-spread of the received spread spectrum signal using the inverse-spread signal. Such inverse spread signal is then information-modulated to obtain the information signal.

During mobile communication, a portion of a transmission signal is reflected, diffracted, and scattered by topography or construction such as buildings to reach a reception side via different routes and at different times. For example, a reflected wave, which is the one that is reflected by construction, reaches the reception side later than a direct transmission wave, which is the one that directly reaching from the transmission side to the reception side. The reason behind this is that, the route of the reflection wave is longer than that of the direct wave. Time difference between when the direct wave reaches the reception side and when the delay wave, that is the reflection wave that has been delayed, will be substantially about a few 10 microseconds. The route of the signal traveling from a transmission side to a reception side is referred as "path". Transmission environment wherein a transmission signal travels via a plurality of paths is referred as "multipath". Under multipath environment, a reception side is destined to receive a multiplex wave. In a multiplex wave, signals of a plurality of paths of which delay times are different are overlapped because a plurality of same spread spectrum signals respectively reach at different times. In mobile communication, there is a motion on the transmission side or the reception side. Therefore, during mobile communication, fading, which is an alternation in amplification of multiplex wave, occurs. The fading occurs because a way in which the phrases are combined always changes due to the motion of the transmission side or the reception side.

A RAKE-receiver is the one which RAKE-combines (maximum-ratio-combines) a signal output from a plurality of RAKE-fingers for separating five predetermined path signals by inverse-spreading a received multiplex wave with a combiner to perform a weight application corresponding to a reception signal level. Signal-electric-power-ratio against thermal noise and interference of a received multipath signal is improved by performing RAKE reception, so that diversity reception is realized. However, it is necessary to select a plurality of path signals proper for RAKE-combination in order to inverse-spread each path signal from a multiplex wave to perform RAKE-combination.

The selection of path signals proper for RAKE-combination is performed with a delay profile indicating a correlation value calculated with a reception spread spectrum signal and a predetermined reference spread code and a delay time therein by each sample point. It is considered that an information signal is included in a signal whose correlation electric power value is greater among sampling points of the delay profile. Therefore, it will be better to select a signal of the sampling points at which the correlation electric power value is greater as a signal of the path proper for RAKE-combination. For example, in a case of a spread spectrum receiver provided with three sets of RAKE-fingers for inverse-spreading, there will be three RAKE-combinable paths. In this case, as shown in FIG. 18, a method for selecting a signal of path of detecting three sampling points in order having highest correlation value may be adopted.

If there is no time-correlation in thermal noise and interference among the sampling points shown in FIG. 18, then a sampling point is detected in order by a point whose correlation value is greater and thereafter inverse-spread signals are RAKE-combined respectively corresponding to a delay time of the detected sampling points. Thus, signal electric power Sc standardized with interference and thermal noise after RAKE-combination becomes maximum and may be represented by following equation. Si is directed to a correlation electric power value in the i-th order detection path timing.

$$Sc = \sum_{i=1}^{3} Si$$

However, there exists a time correlation in thermal noise and interference among real sampling points. Therefore, if signals of path detected in order from a greater correlation value are merely combined, a signal electric power Sc will be reduced. The amplitude of signal electric power Sc is concretely represented by following equation. Herein, s=(s1, s2, s3) T and si is directed to a correlation value corresponding to timing i.

$$Sc = \frac{(s^T s)^2}{s^T R s}$$

$$R = \begin{bmatrix} \rho 1.1 & \rho 1.2 & \rho 1.3 \\ \rho 2.1 & \rho 2.2 & \rho 2.3 \\ \rho 3.1 & \rho 3.2 & \rho 3.3 \end{bmatrix}$$

ρij is directed to time correlation coefficient of noise and interference between timings i and j. Namely, the narrower, a distance between sampling points to be detected is, in other word, when arrival times are extraordinarily close (when delay times are mutually closed in a delay profile), the greater, time correlation in thermal noise and interference among these signals is. There exists a method for detecting a sampling point in order from the sampling point whose correlation value is greater by sampling points whose delay time is sufficiently spaced with respect to a detected sampling point as shown in FIG. 19 in order to eliminate affection owing to time correlation of thermal noise and interference among the sampling points and make a signal electric power standardized with interference and thermal noise.

Further, in Japanese Patent Laid-open Application No. 10-336072, a first path is detected by selecting a sampling point whose correlation value is greatest in a delay profile shown in FIG. 20 (refer to FIG. 20(a)). Thereafter, sampling points positioned within ±k numbers of sampling points (k is a natural number) are eliminated from an object to be selected with respect to sampling points having been already detected and a second path is detected (refer to FIG. 20(b)). Next, a third path is detected by selecting a sampling point whose correlation value is greatest from among sampling points positioned except for within ±k numbers of sampling points with respect to a sampling point of a second path (refer to FIG. 20 (c)). As above-explained, there exists a method for selecting a path proper for RAKE-combination by setting a distance between samples to be selected as a distance corresponding to k or greater numbers of samples.

Furthermore, in Japanese Patent Laid-open Application No. 10-308688, a delay profile is produced by performing cyclic integration after electric power conversion in order to perform average calculation by excluding affection of fading alternation and a carrier frequency deviation at the time of transmission and reception. Then, a theoretical value of result of inverse-spread of a reference code and an ideal reception signal and a portion where maximum amplification portion of a correlation value is eliminated by a pseudo correlation elimination portion is called from a delay profile to have the delay profile impulse-shaped whereby a path for RAKE-combination is detected. Additionally, a theoretical value of result of inverse-spread of a reference code and an ideal reception signal with a matrix calculation of a reception signal whereby a path for RAKE-combination is detected.

As above-explained, the reception side is destined to receive a multiplex wave wherein signals whose delay times are different have been overlapped under a multipath environment, because transmitted spread spectrum signals reach via a plurality of paths and at different times. Therefore, in order to eliminate affection of multi-fading, numbers of signals corresponding to numbers of RAKE fingers are selected by a delay profile produced by calculating a correlation value between a predetermined reference spread code and a reception multiplex signal to separate a path signal by inverse-spreading a multiplex wave in accordance with a delay time of a selected path signal to RAKE-combine the separated path signals whereby a ratio of a signal electric power to interference and thermal noise must be improved. As a result, it is important how a path signal proper for RAKE-combination should be selected in order to optimize effect of improvement of the ratio relating to the signal electric power with RAKE-combination.

For example, there exists little effect of improvement of the ratio relating to the signal electric power with RAKE-combination when time correlation of thermal noise and interference between selected paths is too great. As above, effect of improvement of the ratio relating to the signal electric power with RAKE-combination is largely dependent on correlation of thermal noise and interference of each of path signals. Because numbers of RAKE-fingers forming a RAKE-combination modulator are limited, a path signal whose time correlation of thermal noise and interference are great is not RAKE-combined, rather, a path signal whose time correlation of thermal noise and interference are great is RAKE-combined, so that the effect of RAKE-combination by the latter becomes larger than an effect when path signals are merely combined in order from a signal having greater correlation value.

According to the technology disclosed in Japanese Patent Laid-open Application No. 10-336072, sampling points positioned within ±k numbers of sampling points are eliminated from an object to be selected for a second path with respect to sampling points detected as a first path, so that there lies a problem that even if a sampling point is one capable of improving characteristic with RAKE-combination, the sampling point may not be detected as a second path. There lies a possibility that characteristic is deteriorated by RAKE-combination, because a sampling point positioned except for within ±k numbers of sampling points with respect to sampling points detected as a first path, as a second path if a correlation value is greater in spite of time correlation of thermal noise and interference. Namely, there lies a possibility that signal characteristic is further deteriorated if inverse-spread signals are RAKE-combined corresponding to a delay time of signal of each of detected paths, because the paths are not detected, considering over time correlation of thermal noise and interference.

According to the technology disclosed in Japanese Patent Laid-open No. 10-308688, a delay profile is produced by performing cyclic integration after electric power conversion. However, affection owing to electrical power conversion is not considered for this delay profile, so that any optimum path may not be detected for RAKE-combination. According to the conventional invention disclosed in Japanese Patent Laid-open Application No. 10-308688, a delay profile is made to be impulse-shaped and thereafter a path to be RAKE-combined is detected. However, even a path such as may improve characteristic by RAKE-combination is destined to be cut off. Further, in a case of even a path such as being deteriorated regarding as characteristic, if an electric power is greater, then the path is destined to be detected. Furthermore, a cyclic addition is performed at a voltage level and a delay profile is corrected at a voltage level. However, the correction may not be performed because a ratio of a signal to interference of the delay profile is too poor.

When a spread code whose period is longer than a symbol period is used, or when length of already-known transmission symbol sequence is longer, amount of calculation for obtaining a theoretical value of inverse-spread result of reference code and a reception signal becomes vast. This will result in a larger circuit which consumes higher electrical power, because, such a vast number of calculations are performed by each time of detection of RAKE-combination path timing. For example., if a cell radius exceeds over about 10 km and a chip-rate exceeds over about 4 MHz, then it must be considered that the delay spread is represented by about 256 chips. Further, if the operation is performed with 4-times-over sample, then a 1024×1024 matrix must be inversed. This is not realistic, because calculation is too vast to detect a signal of path proper for RAKE-combination, following an environment of propagation of mobile station moving with high-speed. Optionally, there is no guarantee that such an inverse-matrix always exists. As a result, there is possibility that the inverse-matrix may not exist, so that a RAKE-combination timing may not be detected.

According to the technology disclosed in Japanese Patent Application No. 10-308688, a pseudo correlation elimination portion for correcting a delay profile is arranged independently of a synchronization detection portion for detecting a path for RAKE-combination. As a result, hardware become large scaled and it consumes higher electric power.

The present invention is devised in order to overcome the above-explained problems. It is an object of this invention to select a path signal proper for RAKE-combination, considering over a time correlation of thermal noise and interference to RAKE-combine the selected path signals whereby a spread spectrum reception apparatus for improving a ratio of a signal electric power to interference and thermal noise is provided.

SUMMARY OF THE INVENTION

The spread spectrum reception apparatus according to the present invention is provided with a RAKE-combination-unit and a RAKE-combination signal detection unit. The RAKE-combination-unit includes a plurality of inverse-spread units each of which inverse-spreads a spread spectrum being signal spread-modulated and transmitted, using an inverse-spread code being delayed for a predetermined time whereby the predetermined delay time signal is separated from the spread spectrum signal; a combining unit which RAKE-combines the signal inverse-spread by the inverse-spread units; and a delay unit which delays the inverse-spread codes supplied to the inverse-spreading units based on a delay control signal input from outside. The RAKE-combination signal detection unit includes a delay profile generation unit which generates a delay profile with a correlation electric power value obtained by converting a correlation value of the spread spectrum signal and a reference spread code into an electric power and the delay time; a correction coefficient storing unit which stores already calculated correction coefficient based on time correlation between interference and thermal noise by each deviation of the delay time; a delay profile correction unit which measures a deviation between a delay time of signal whose correlation electric power value is maximum and a delay time of signal in the delay profile and corrects a correlation electric power value in the delay profile using a multiply value obtained by multiplying a correction coefficient read from the correction coefficient storing unit corresponding to the measured deviation by a maximum electric power value in the delay profile; and a signal detection unit which detects a signal whose correlation electric power value becomes maximum in the delay profile produced by the delay profile producing unit to output a delay time of the detected signal as a first delay control signal and a delay time of signal whose correlation electric power value becomes maximum in the corrected delay profile corrected by the delay profile correction unit as a second delay control signal to the delay unit.

Further, in the spread spectrum reception apparatus according to the present invention, the delay profile correction unit is provided with an average calculating unit which calculates an average of the correlation electric power value of the delay profile, and the delay profile correction unit multiplies a value obtained by subtracting the average calculated by the average calculating unit from a maximum correlation electric power value in the delay profile by a correction coefficient.

Further, in the spread spectrum reception apparatus according to the present invention, the delay profile producing unit is provided with a threshold value discriminating unit which compares the correlation electric power value with a predetermined threshold value and decides whether the correlation electric power value is equal to more than the threshold value, and the delay profile producing unit produces a delay profile based on a correlation electric power value that is greater than the threshold value.

Further, in the spread spectrum reception apparatus according to the present invention, the delay profile producing unit is provided with a correlation electric power value storing unit which stores the correlation electric power value of a signal for which the threshold value discriminating unit decides that the correlation power value is greater than the threshold value; and a delay time storing unit which stores a delay time of the signal whose correlation electric power value is greater than the threshold value.

The spread spectrum reception method according to the present invention is a method of detecting a plurality of signals whose correlation value is greater based on a delay profile produced with a correlation value of a reception spread spectrum signal and a reference spread code to use an inverse-spread code delayed corresponding to a delay time the detected signal to RAKE-combine signals separated from the reception spectrum spread signal. This method includes the steps of producing a delay profile based on a correlation electric power value obtained by converting the correlation value to electric power; detecting a delay time of a signal whose correlation electric power value is maximum of the delay profile produced in the delay profile producing step; measuring a deviation between the delay time detected in the first RAKE-combination signal detection step and the delay time of any other signal in the delay profile; correcting the delay profile using a correction coefficient corresponding to the calculated deviation, which correction coefficient is obtained from already stored plurality of correction coefficients calculated from time correlation between interference and noise due to temperature, and the correlation electric power value of a signal detected in the first RAKE-combination signal detection step; and detecting a delay time of signal whose correlation electric power value becomes maximum based on the corrected delay profile in the delay profile correction step.

Further, in the spread spectrum reception method according to the present invention, at the delay profile correction step an average of correlation electric power values of the delay profile is calculated and the correlation electric power value of the delay profile is corrected using the calculated average.

Further, in the spread spectrum reception method according to the present invention, at the delay profile producing step, the correlation electric power value is compared with a predetermined threshold value and a delay profile is produced based on a signal whose correlation electric power value is greater than the threshold value.

BRIEF DESCRIPTION OF THE DRAWINGS

FIG. 7 explains about a delay profile for using a second path detection and the second path detection.

FIG. 8 is explains about a delay profile for using a third path detection and the third path detection.

BEST MODE FOR CARRYING OUT THE INVENTION

The present invention will be explained in detail below while referring to the accompanying drawings.

Figure 1:
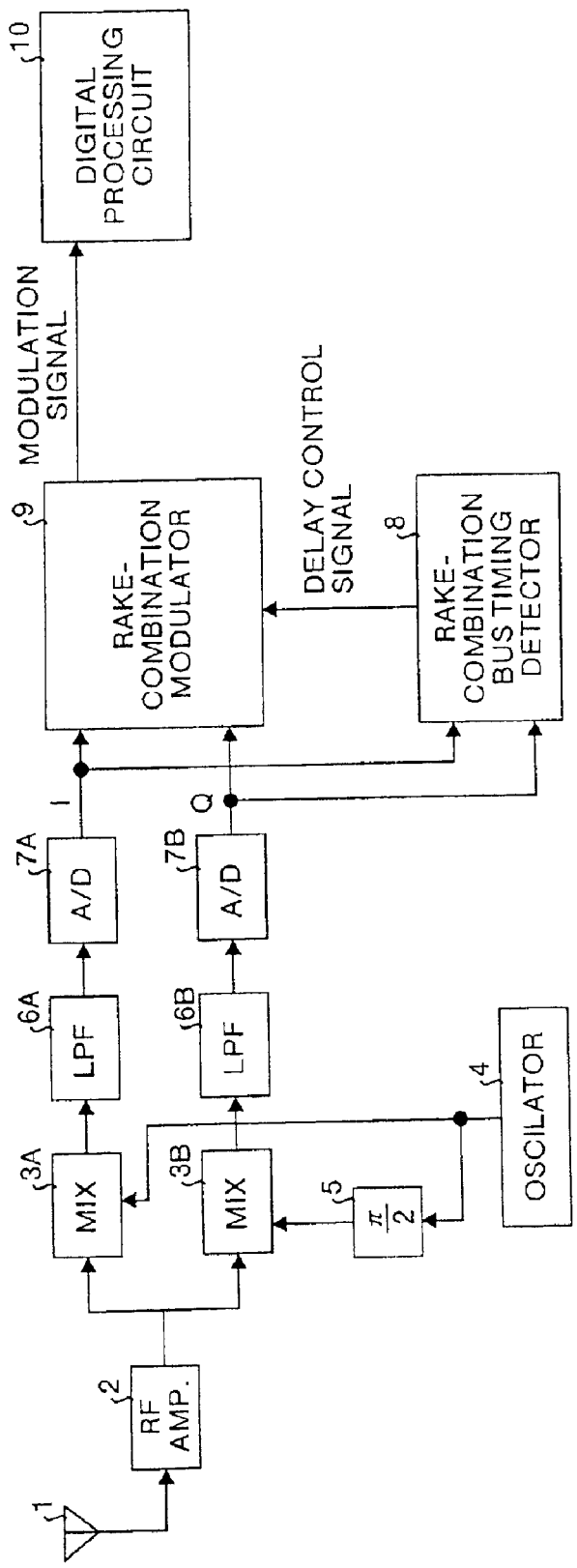
FIG. 1 is a block diagram showing a construction of a spread spectrum reception apparatus according to the present invention.
Figure 2:
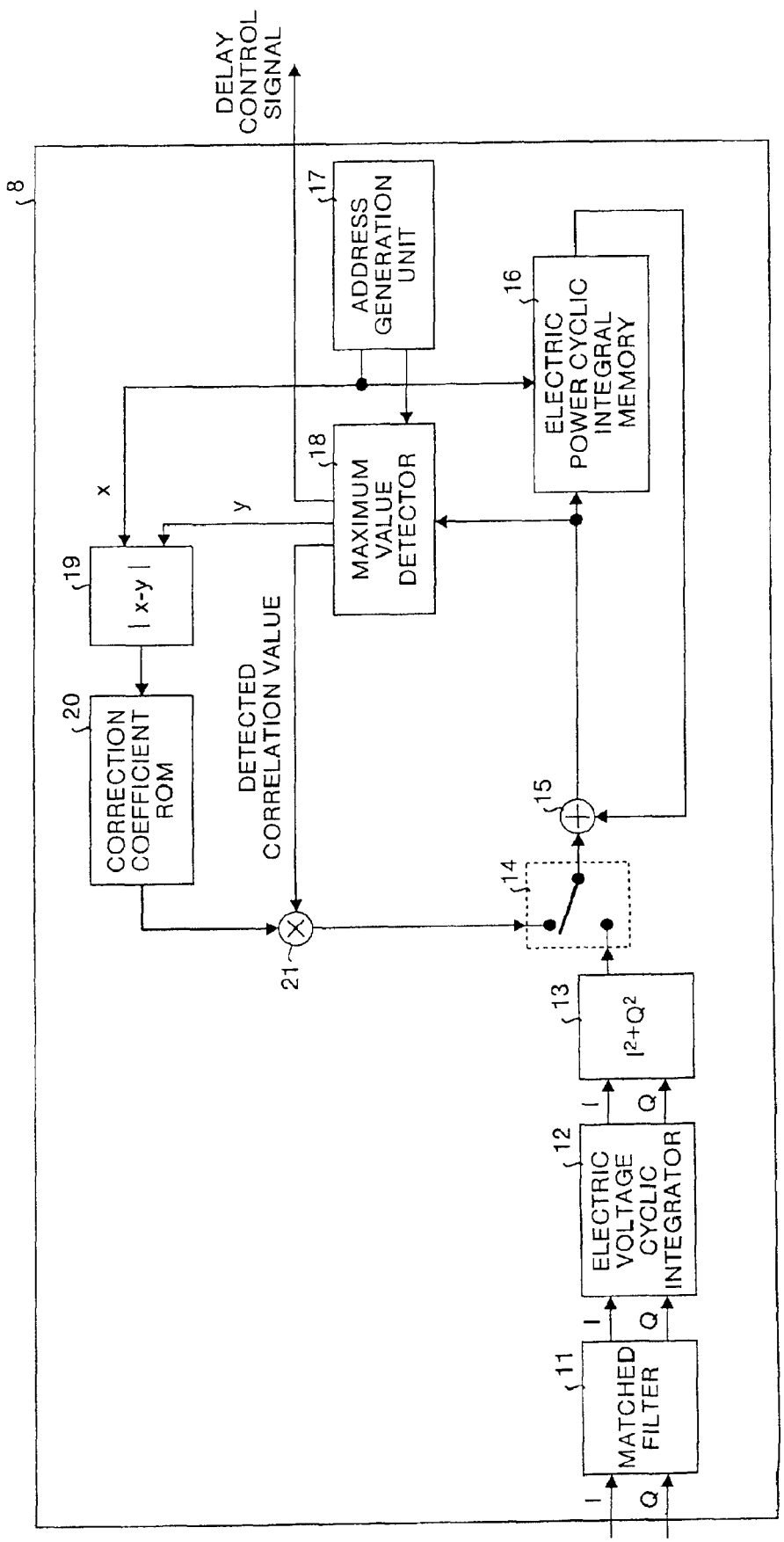
FIG. 2 is a block diagram showing a construction of a RAKE-combination path timing detector provided in a spread spectrum reception apparatus according to a first embodiment of the present invention.

FIG. 1 is a block diagram showing a construction of a spread spectrum reception apparatus according to the present invention. FIG. 2 is a block diagram showing a construction of a RAKE-combination path timing detector. In FIG. 1, reference numeral 1 denotes an antenna, reference numeral 2 denotes an RF amplifier, reference numerals 3A and 3B denote mixers, reference numeral 4 denotes a local oscillator, reference numeral 5 denotes a 90-degrees-phase shifter, reference numerals 6A and 6B denote low pass filters, reference numerals 7A and 7B denote A–D converters, reference numeral 8 denotes the RAKE-combination path timing detector, reference numeral 9 denotes a RAKE-combination modulator, and reference numeral 10 denotes a digital processing circuit.

The construction and the operation thereof will be explained hereinafter. The local oscillator 4 supplies a local oscillation having a frequency substantially equal to a frequency of a desired signal to the mixers 3A and 3B. The 90-degrees-phase shifter 5 is arranged between the mixer 3B and the local oscillator 4. The 90-degrees-phase shifter 5 90-degrees-phase-shifts a local oscillation signal output from the local oscillator 4 to output the shifted local oscillation signal to the mixer 3B. In addition to the local oscillation signal, a multiplex signal received through the antenna 1 and amplified by the RF amplifier 2 and divided into two channels is input into the mixers 3A and 3B. The mixers 3A and 3B, the local oscillator 4, and 90-degree-phase shifter 5 thus quadrature-detect a received spread spectrum signal to output T-channel and Q-channel base band signals.

I-channel base band signal is input from the mixer 3A to the low pass filter 6A. Q-channel base band signal is input from the mixer 3B to the low pass filter 6B. The low path filter 6A filters the I-channel base band signal, and the low path filter 6B filters the Q-channel base band signal to pick up a desired signal. These filtered I-channel and Q-channel base band signals are respectively output to A–D converters 7A and 7B, where the analog signal is converted to digital signal.

The A–D converters 7A and 7B respectively sample the analog I-channel and Q-channel base band signals to obtain digital signals. The I-channel and Q-channel digital signal are output to the RAKE-combination path timing detector 8 and the RAKE-combination modulator 9.

The operation performed by the RAKE-combination path timing detector 8 and the RAKE-combination modulator 9 will be explained hereinafter. Under a multipath environment, as already-explained, the transmitted spread spectrum signals reach via a plurality of paths and at different times, so that a reception side receives a multiplex wave wherein signals whose delay times are different are overlapped. Therefore, following procedure is required to be performed in order to eliminate affection of multipath fading. By a delay profile produced by calculating a correlation value of a predetermined reference spread code and digital signals of I-channel and Q-channel which are multiplex signals wherein a plurality of path signals are included at this stage, path signals proper for RAKE-combination of numbers corresponding to numbers of RAKE fingers are selected. The multiplex wave is inverse-spread in accordance with a delay time of the selected path signal, so that the path signals are divided and the divided path signals are RAKE-combined.

The RAKE-combination path timing detector 8 is the one that produces a delay profile and selects a path signal proper for RAKE-combination and outputs a delay time of the selected signal as a delay control signal. The RAKE-combination modulator 9 inverse-spreads a multiplex wave with an inverse-spread which has been delayed in accordance with a delay time of the path signal detected by the RAKE-combination path timing detector 8. RAKE-combination path timing detector 8 outputs a delay time of the detected path signal as a delay control signal. The RAKE-combination modulator 9 inverse-spreads a duplex signal with an inverse spread code which has been delayed in accordance with a delay control signal output from the RAKE-combination path timing detector 8 and each of inverse-spread path signals are RAKE-combined, so that a ratio of signal electric power to interference and thermal noise may be optimally improved. The RAKE-combination path timing detector 8 performs inverse-spreading and RAKE-combining, the information-modulated modulation signal is error-corrected in the digital processing circuit 10 to reproduce an information signal.

FIG. 2 is a block diagram for indicating a construction of the RAKE-combination timing path detector 8 in the spread spectrum reception apparatus shown in FIG. 1. In FIG. 2, reference numeral 11 denotes a matched filter, reference numeral 12 denotes an electric voltage cyclic integrator, reference numeral 13 denotes an electrical power converter, reference numeral 14 denotes a switch, reference numeral 15 denotes an adder, reference numeral 16 denotes an electrical power cyclic integrator memory, reference numeral 17 denotes an address generation unit, reference numeral 18 denotes a maximum value detector, reference numeral 19 denotes a deviation measurement unit, reference numeral 20 denotes a correction efficient ROM, and reference numeral 21 denotes a multiplier. The RAKE-combination path timing detector 8 shown in FIG. 2 operates, while switching between two operational modes of a delay profile producing mode for producing a delay profile by calculating a correlation value of data of I-channel and Q-channel and a predetermined reference spread code and a RAKE-combination path timing detection mode for selecting path signals proper for RAKE-combination of numbers corresponding to numbers of RAKE fingers.

Further, construction and operation of the RAKE-combination path timing detector 8 shown in FIG. 2 will be explained hereinafter. When a delay profile is produced, the switch 14 establishes a signal path between the electric power converter 13 and the adder 15. In a delay profile producing mode, I-channel digital data output from A–D converter 7A and Q-channel digital data output from A–D converter 7B are input into the matched filter 11. The matched filter 11 correlation-calculates between the predetermined reference spread code and the I-channel and Q-channel digital data to output the correlation value to the electric voltage cyclic integrator 12 by each sample. The matched filter 11 is a transversal filter provided with a data shift resister wherein a correlation value is output by each sample by input of reference delay code as a weighing coefficient of the transversal filter.

Figure 3:
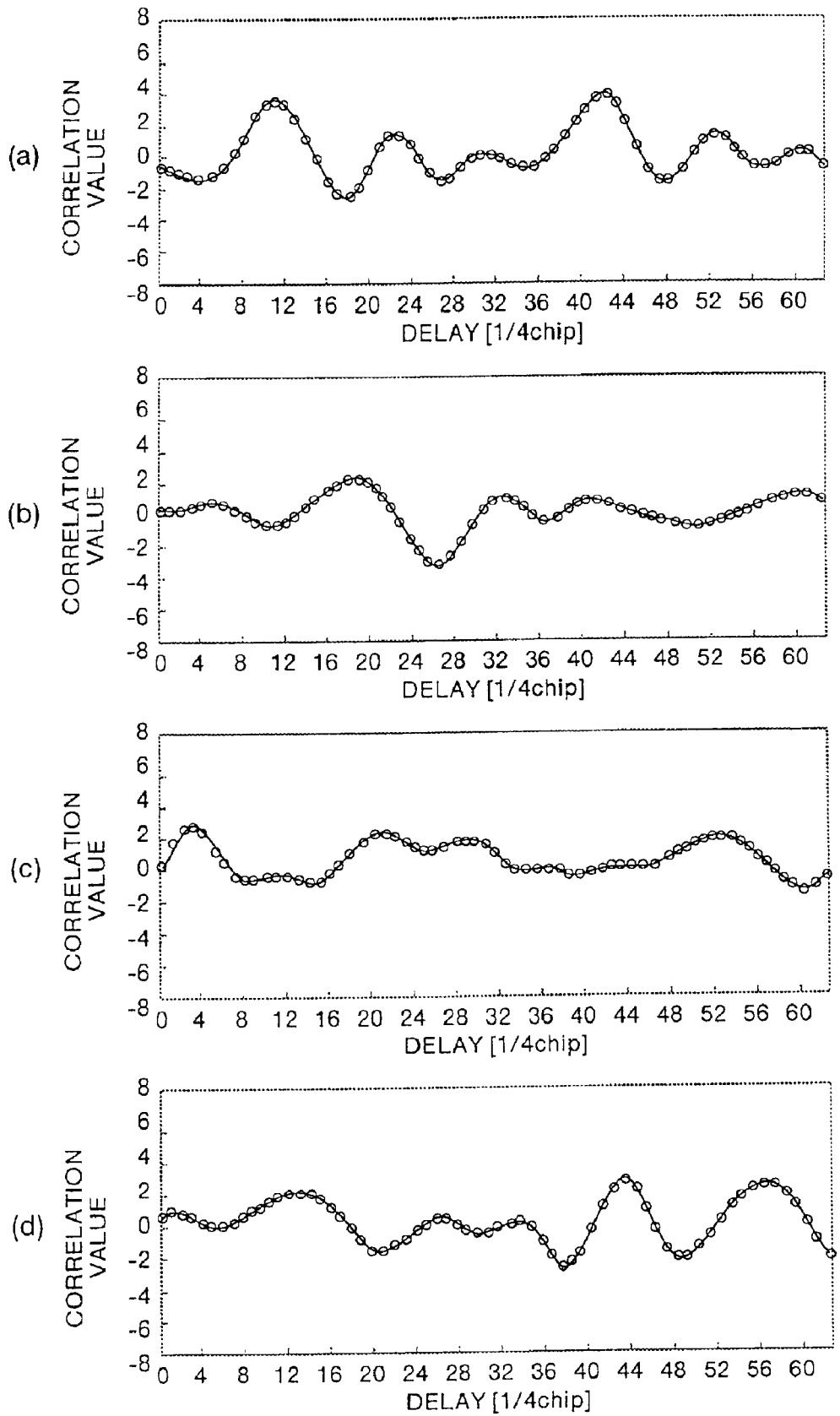
FIG. 3 shows the result of calculation of correlation value.
Figure 4:
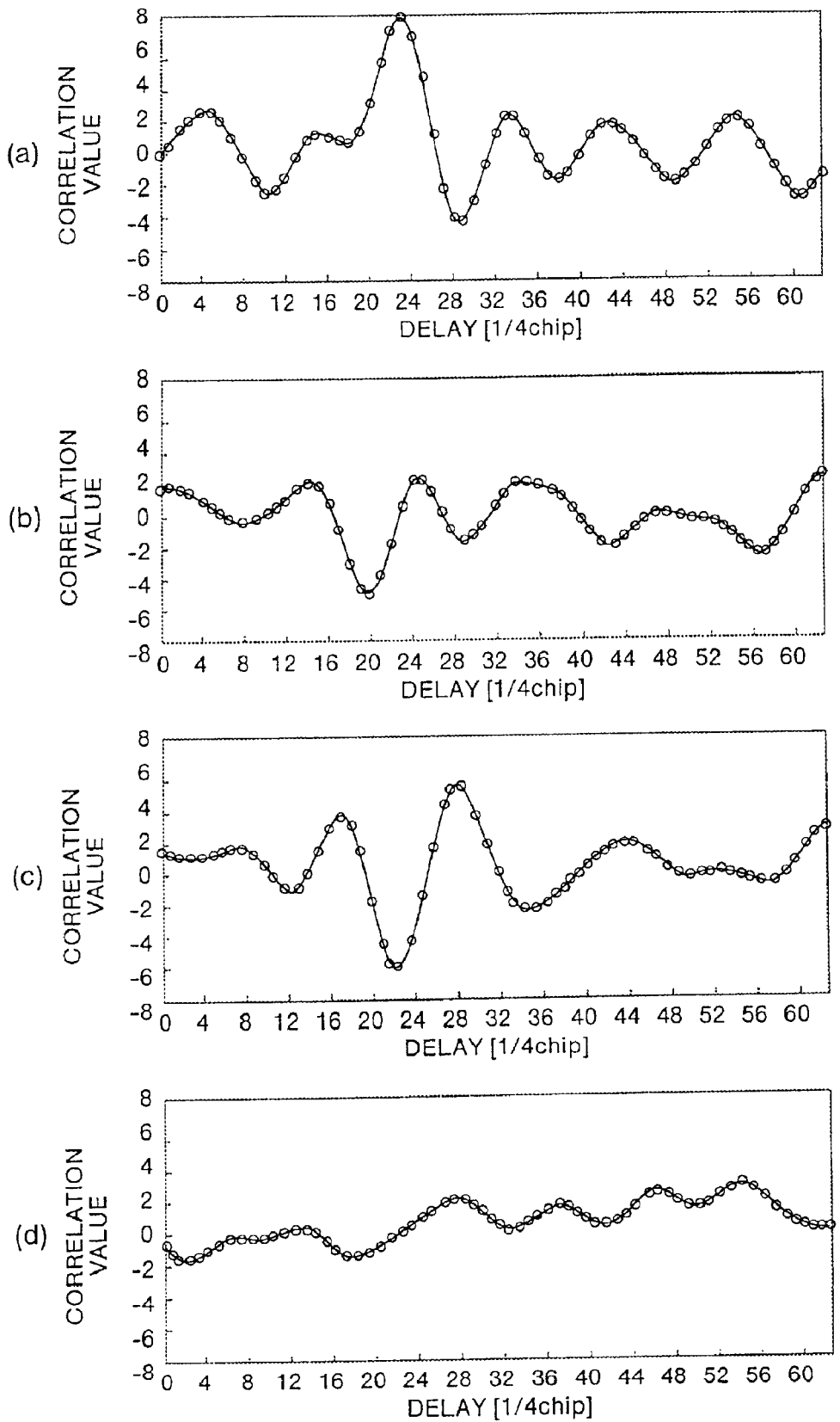
FIG. 4 shows the result of cyclic integration of electric voltage.

FIG. 3 shows output of the matched filter 11. FIGS. 3(*a*), (*b*), (*c*), and (*d*), each shows outputs of the matched filter 11 whose timing is mutually different. However, at an output stage of the matched filter 11, there exists much thermal noise and much interference between the other channels, so that few signal components may not be observed. Then, the electric voltage cyclic integrator 12 performs cyclic integration so that correlation values shown in FIGS. 3(*a*) to (*d*) output by each sample from the matched filter 11 are matched by each delay time, so that the ratio of signal electric power to due to interference and thermal noise is improved. FIG. 4 shows output of the electric voltage cyclic integrator 12. As a result of the cyclic integration in the electric voltage cyclic integrator 12, the peak in FIG. 4 appears shaper than that in FIG. 3, so that a signal-mannered level may be observed. Namely, it may be seen that a ratio of a signal electric power to interference and thermal noise has been somewhat improved.

Additional cyclic integration of electric voltage is required in order to improve the ratio of signal to electric power degrading due to interference and thermal noise of correlation value output from the electric voltage cyclic integrator 12. Addition may not be performed with the same phase even if cyclic integration of electric voltage is anymore performed by affection of deviation of frequency of carrier wave between transmission and reception and fading alternation. Then, the electric power calculator 13 converts a correlation value shown in FIGS. 4(*a*) to (*d*) into electric power by each delay time to output the converted correlation value to the adder 15 and the electrical power cyclic integral memory 16. The adder 15 and the electrical power cyclic integral memory 16 perform cyclic integration of electrical power for matching output correlation electric power values by each delay time whereby the ratio of signal to electrical power degrading due to interference and thermal noise is further improved. The correlation electric power value whose ratio of signal electric power to interference and thermal noise has been improved will be read into an electric power cyclic integral memory 16.

Figure 5:
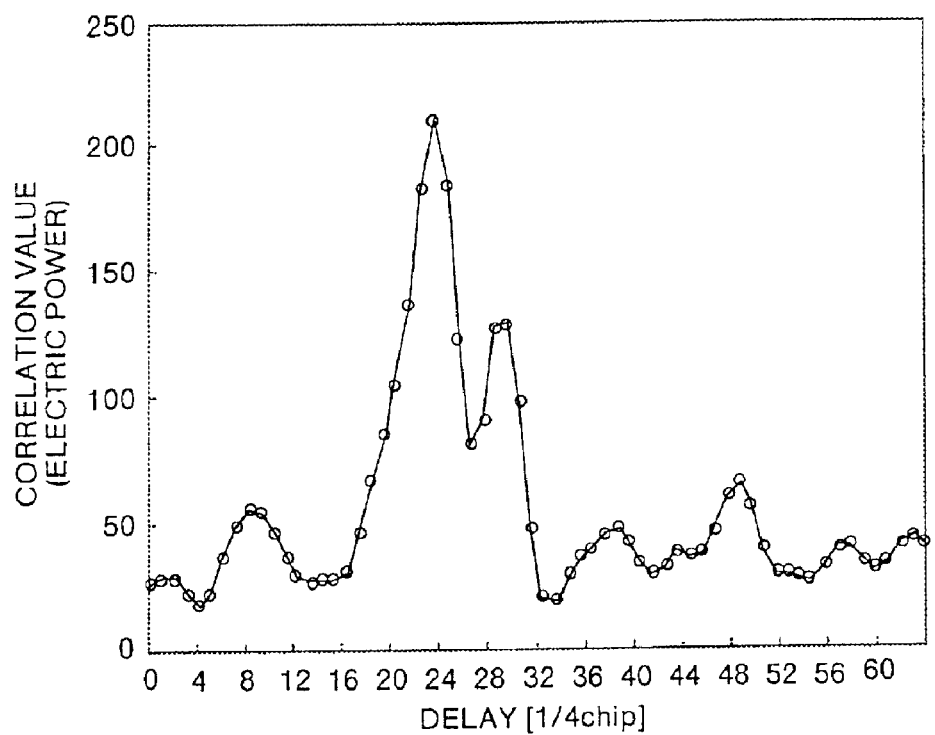
FIG. 5 shows the produced delay profile (Doppler spread profile).

The address generation unit 17 outputs an address as an address for discriminating sampling points, each having a predetermined correlation value to the electric power cyclic integral memory 6. Through above-process, sampling points each having a predetermined electric power value are made to be arranged by each delay time to produce a delay profile wherein sampling points whose address is labeled are stored. The produced delay profile is stored in the electric power cyclic integral memory 16. FIG. 5 shows a delay profile. From the delay profile shown in FIG. 5, it can be seen that correlation electric power of sampling points whose addresses are 2 through 30, of the 64 sampling points, have higher correlation electric power. The RAKE-combination path timing detector 8 shown in FIG. 2 selects a path signal proper for RAKE-combination using a delay profile produced by above-mentioned process.

Figure 6:
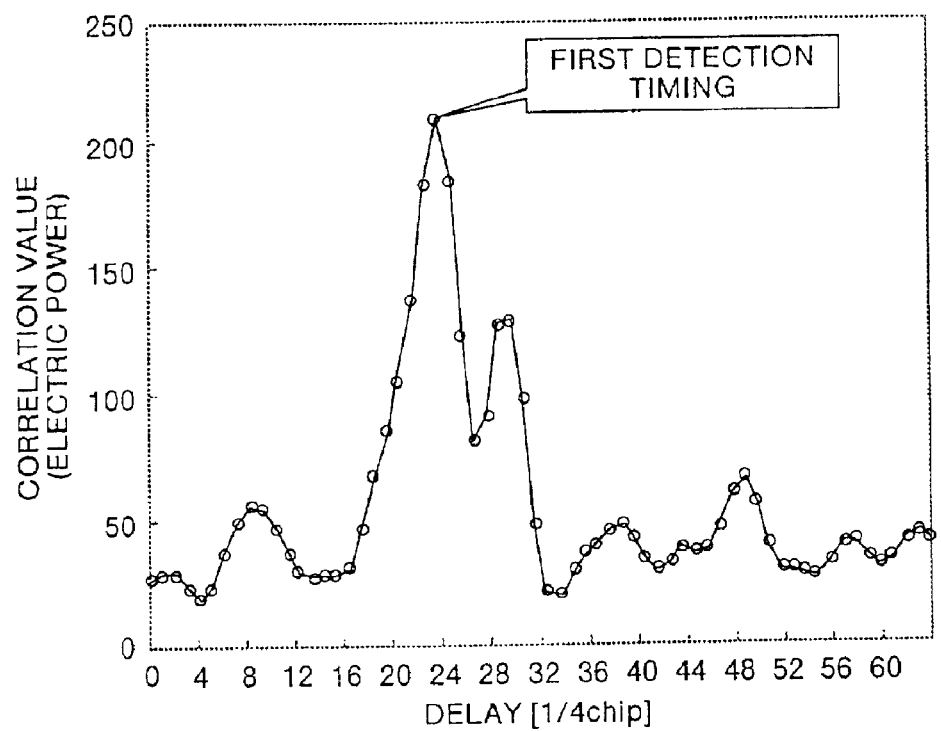
FIG. 6 explains about a delay profile for using a first path detection and the first path detection.

When a path signal proper for RAKE-comb-nation using a delay profile is selected to performing detection of timing of path of RAKE-combination for detecting the delay time, the switch 14 establishes a signal path between the multiplier 21 and the adder 15. About the detection of the timing of the path of RAKE-combination will be explained using FIG. 2, FIG. 6 to FIG. 8. FIG. 6 explains about a delay profile for using a first path detection and a first path detection. FIG. 7 explains about a delay profile for using a second path detection and a second path detection. FIG. 8 explains about a delay profile for using a third path detection and a third path detection. Furthermore, Table 1 shows numerical data for explaining about RAKE-combination path timing detection.

TABLE 1

| ADDRESS | CORRELATION ELECTRIC POWER VALUE WHEN THE FIRST PATH IS DETECTED | VALUE OBTAINED BY MULTIPLYING CORRECTION COEFFICIENT BY CORRELATION MAXIMUM VALUE | CORRELATION ELECTRIC POWER VALUE WHEN THE SECOND PATH IS DETECTED | VALUE OBTAINED BY MULTIPLYING CORRECTION COEFFICIENT BY CORRELATION MAXIMUM VALUE | CORRELATION ELECTRIC POWER VALUE WHEN THE THIRD PATH IS DETECTED |
|---|---|---|---|---|---|
| 1 | 27.8 | | 27.8 | | 27.8 |
| 2 | 27.7 | | 27.7 | | 27.7 |
| 3 | 27.8 | | 27.8 | | 27.8 |
| 4 | 22.7 | | 22.7 | | 22.7 |
| 5 | 17.6 | | 17.6 | | 17.6 |
| 6 | 22.5 | | 22.5 | | 22.5 |
| 7 | 35.9 | | 35.9 | | 35.9 |
| 8 | 49.0 | | 49.0 | | 49.0 |
| 9 | 55.6 | | 55.6 | | 55.6 |
| 10 | 54.2 | | 54.2 | | 54.2 |
| 11 | 47.5 | | 47.5 | | 47.5 |
| 12 | 37.9 | | 37.9 | | 37.9 |
| 13 | 28.9 | | 28.9 | | 28.9 |
| 14 | 26.8 | −4.2 | 22.6 | | 22.6 |
| 15 | 28.0 | −2.1 | 25.9 | | 25.9 |
| 16 | 27.7 | −2.1 | 25.6 | | 25.6 |
| 17 | 30.9 | −4.2 | 26.6 | | 26.6 |
| 18 | 46.0 | −14.8 | 31.2 | | 31.2 |

TABLE 1-continued

| ADDRESS | CORRELATION ELECTRIC POWER VALUE WHEN THE FIRST PATH IS DETECTED | VALUE OBTAINED BY MULTIPLYING CORRECTION COEFFICIENT BY CORRELATION MAXIMUM VALUE | CORRELATION ELECTRIC POWER VALUE WHEN THE SECOND PATH IS DETECTED | VALUE OBTAINED BY MULTIPLYING CORRECTION COEFFICIENT BY CORRELATION MAXIMUM VALUE | CORRELATION ELECTRIC POWER VALUE WHEN THE THIRD PATH IS DETECTED |
|---|---|---|---|---|---|
| 19 | 67.2 | −10.6 | 56.7 | −2.4 | 54.3 |
| 20 | 85.6 | −4.2 | 81.4 | −1.2 | 80.2 |
| 21 | 104.7 | −31.7 | 73.1 | −1.2 | 71.9 |
| 22 | 139.4 | −211.0 | 0.0 | −2.4 | 0.0 |
| 23 | 184.8 | −211.0 | 0.0 | −8.3 | 0.0 |
| 24 | 211.0 | −211.0 | 0.0 | −5.9 | 0.0 |
| 25 | 186.3 | −211.0 | 0.0 | −2.4 | 0.0 |
| 26 | 124.5 | −211.0 | 0.0 | −17.7 | 0.0 |
| 27 | 82.1 | −31.7 | 50.4 | −118.0 | 0.0 |
| 28 | 92.0 | −4.2 | 87.8 | −118.0 | 0.0 |
| 29 | 128.3 | −10.6 | 118.0 | −118.0 | 0.0 |
| 30 | 130.0 | −14.8 | 115.2 | −118.0 | 0.0 |
| 31 | 98.2 | −4.2 | 94.0 | −118.0 | 0.0 |
| 32 | 48.9 | −2.1 | 46.8 | −17.7 | 29.1 |
| 33 | 21.3 | −2.1 | 19.2 | −2.4 | 16.8 |
| 34 | 20.1 | −4.2 | 15.9 | −5.9 | 10.0 |
| 35 | 30.2 | | 30.2 | −8.3 | 21.9 |
| 36 | 36.5 | | 36.5 | −2.4 | 34.1 |
| 37 | 40.2 | | 40.2 | −1.2 | 39.1 |
| 38 | 45.7 | | 45.7 | −1.2 | 44.5 |
| 39 | 47.9 | | 47.9 | −2.4 | 45.5 |
| 40 | 43.3 | | 43.3 | −2.4 | 40.9 |
| 41 | 33.5 | | 33.5 | 0.0 | 33.5 |
| 42 | 29.7 | | 29.7 | | 29.7 |
| 43 | 32.8 | | 32.8 | | 32.8 |
| 44 | 37.2 | | 37.2 | | 37.2 |
| 45 | 36.5 | | 36.5 | | 36.5 |
| 46 | 37.3 | | 37.3 | | 37.3 |
| 47 | 46.1 | | 46.1 | | 46.1 |
| 48 | 60.1 | | 60.1 | | 60.1 |
| 49 | 65.9 | | 65.9 | | 65.9 |
| 50 | 56.4 | | 56.4 | | 56.4 |
| 51 | 40.1 | | 40.1 | | 40.1 |
| 52 | 30.3 | | 30.3 | | 30.3 |
| 53 | 29.0 | | 29.0 | | 29.0 |
| 54 | 28.2 | | 28.2 | | 28.2 |
| 55 | 27.4 | | 27.4 | | 27.4 |
| 56 | 32.4 | | 32.4 | | 32.4 |
| 57 | 41.1 | | 41.1 | | 41.1 |
| 58 | 41.9 | | 41.9 | | 41.9 |
| 59 | 35.0 | | 35.0 | | 35.0 |
| 60 | 31.1 | | 31.1 | | 31.1 |
| 61 | 35.2 | | 35.2 | | 35.2 |
| 62 | 42.6 | | 42.6 | | 42.6 |
| 63 | 44.9 | | 44.9 | | 44.9 |
| 64 | 41.6 | | 41.6 | | 41.6 |

In Table 1, numerical values in the column "correlation electric power value when the first path is detected" indicate values of correlation electric power value of the sampling points in the delay profile shown in FIG. 6. Numerical values in the columns "correlation electric power value when the second path is detected" and "correlation electric power value when the third path is detected", respectively indicate values of correlation electric power value of the sampling points in the delay profile shown in FIG. 7 and FIG. 8.

In a RAKE-combination path timing mode, the maximum value detector 18 reads a delay profile from the electrical power cyclic integral memory 16 to perform comparison of a correlation electric power value of each of sampling points shown in Table 1. As shown in Table 1 and FIG. 6, a correlation electric power value selects sampling point/s having a correlation electric cower value of 211 as a first path to output the correlation electric power value (211) as a detected correlation value to the multiplier 21. The maximum value detector 18 outputs a delay time of sampling point selected as the first path as a delay control signal to the RAKE-combination modulator 9 and outputs the address (24) as y shown in FIG. 2 to a deviation measurement unit 19. The deviation measurement unit 19 receives all the addresses (1 to 64) of the delay profile in order from the address generation unit 17.

The deviation measurement unit 19 calculates an absolute value of ($|x-y|$) of deviation between the address (1 to 64) input as x and the address (24) input as y. For example, value 23 is obtained as an absolute value of deviation between the sampling point of address 1 (x=1) and that of address 24 (y=24) because $|1-24|=23$. Further, deviation of signals whose addresses are 23 or 25 (x=23, x=25) is 1. Signals whose reach times to a reception side are extraordinarily close, i.e. signals whose deviations are close are inclined to be interfered, so that it is not proper to select such signals whose are close as a path for RAKE-combination. Namely, the deviation measurement unit 19 measures a deviation between delay time of sampling point of address 24 selected as a first path and delay time of the other sampling point to distinguish a first path, a path proper for RAKE-combination, and improper path. The deviation measurement unit 19 outputs the calculated absolute value of deviation to the correction coefficient ROM 20. The correction coefficient ROM 20 stores the correction coefficient corresponding to each deviation (i.e. 0 through 10). An example of correction coefficient corresponding to deviation will be shown in Table 2.

output it in order to the multiplier 21. For example, as shown in Table 2, if the deviation input from the deviation measurement unit 19 is between 0 to 2, then value −1 is output to the multiplier 21. If the deviation is 3 then value −0.15, if the deviation is 10 the value −0.02 is output to the multiplier 21. If the deviation input from the deviation measurement unit 19 is 11 or more, then value 0 is output to

TABLE 2

| TIMING DEVIATION | 0 | 1 | 2 | 3 | 4 | 5 | 6 | 7 | 8 | 9 | 10 |
|---|---|---|---|---|---|---|---|---|---|---|---|
| COEFFICIENT | −1 | −1 | −1 | −0.15 | −0.2 | −0.05 | −0.07 | −0.02 | −0.01 | −0.01 | −0.02 |

A correction coefficient stored in the correction coefficient ROM 20 may be obtained from time correlation of interference and thermal noise. Ideal time correlation will be expressed as follows.

$$\rho|(\tau) = \frac{6\pi^4 \sin|\pi(1+\beta\tau) + 2\{2(2\pi\tau\beta)^4 - 12(2\pi^2\tau\beta)^2 + 13\pi^4\}\sin|\pi(1-\beta)\tau\}}{\pi\tau\{\pi^2 - (2\pi\tau\beta)^2\}\{4\pi^2 - (2\pi\tau\beta)^2\}(8-5\beta)}$$

where β is roll-off-ratio of transmission and reception filter, and τ is chip.

Time correlation of thermal noise will be expressed as follows.

$$\rho n(\tau) = \frac{\cos(\pi\beta t)\sin(\pi t)}{\pi t\{1-(2\beta t)^2\}}$$

A ratio of interference electric power to thermal noise, which are regarded for a reception signal is directed to a: (a−1). Hereinafter as a=0.8, a correction coefficient will be calculated as follows.

$$a\{\rho i(\tau)\}^2 + (a-1)\{\rho n(\tau)\}^2$$

Considering over timing jitter such that time lies digitally in a discrete system, $$\frac{a\{\rho 1(\tau+1/16)^2 + \rho 1(\tau-1/16)^2\} + (a-1)\{\rho n(\tau+1/16)^2 + \rho n(\tau-1/16)^2\}}{2}$$

Further, considering over that a delay profile has 20 dispersion in a delay profile owing to noise, coefficient k (k=1.1) is multiplied thereby. If necessary, in addition to a condition that any assignment is not performed within ±1/2 chip, a correction coefficient will be calculated as follows.

$$\frac{a\{\rho i(\tau+1/16)^2 + \rho i(\tau-1/16)^2\} + (a-1)\{\rho n(\tau+1/16)^2 + \rho n(\tau-1/16)^2\}}{2}k$$

As above-explained, a correction coefficient may be obtained from time-correlation of interference and thermal noise If timing difference is substantially 2/4 chip, any assignment is not performed. Therefore, when timing difference is between 0 to 2, any value whose efficient is −1 or less may be used. The correction coefficient ROM 20 reads a correction coefficient according to the absolute value of deviation output by the deviation measurement unit 19 to the multiplier 21. Since the address of the sampling point whose correlation electric power is the maximum is 24, sampling points having address between 14 to 34 will have deviations less than 10. The correction coefficient ROM 20 outputs coefficients for correcting the correlation electric power value of the sampling points whose address is between 14 to 34 in order of address.

The multiplier 21 multiplies the detected correlation value (211) output by the maximum value detector 18 and the correction coefficients corresponding to the address between 14 to 34 output by the correction coefficient ROM 20 and outputs the result to the adder 15 through the switch 14. The multiplication result is shown in the column "value obtained by multiplying correction coefficient by maximum correlation value". For example, in case of address 14 whose deviation is 10, correction coefficient −0.02 and the detected correlation value 211 are multiplied and the result −4.2 is output to the adder 15. In a same manner, for addresses from 15 to 34, correction coefficient and the detected correlation value are multiplied and result is output to the adder 15. The adder 15 adds the values output from the multiplier 21 and the correlation electric power value of corresponding address to correct a correlation electric power value of a delay profile. The correction result is shown in the column of "correction electric power value when the second path is detected".

For example, the correlation electric power value at address 14 is 26.8 and this value will be added to the result −4.2 of multiplication, resulting in 22.6. In a same manner, the correlation electric power values at addresses 15 to 34 is corrected. Similarly, correlation electric power values of sampling points having address 22 to 26, which have deviations less than 2 corresponding to the deviation at the address 24, will be corrected to 0. The correlation electric power value shown in "correlation electrical value when a second path is detected" is output to the electric power cyclic integral memory 16, so that the delay profile for the second path detection shown in FIG. 7 will be produced.

The second path detection also will be performed in a same way as the first path detection. Namely, when the second path is detected, the maximum value detector 18 reads a delay profile from the electric power cyclic integral memory 16 and compares it with a correlation electric power of each sampling point shown in "correlation electric power value when the second path is detected" in Table 1. As shown in FIG. 7, the sampling point whose correlation electric power value is 118 is selected as a second path. This correlation electric power value (118) is then output as the detected correlation value to the multiplier 21, and the delay time co-responding to this sampling point is output as a delay control signal to the RAKE-combination modulator 9. The maximum value detector 18 outputs the address (29) as y shown in FIG. 2 to the deviation measurement unit 19. The deviation measurement unit 19 calculates absolute value ($|x-y|$) of deviation between address (1 to 64) input as x and address (29) input as y and outputs the absolute value of deviation to the correction coefficient ROM 20. The correction coefficient ROM 20 reads a correction coefficient according to the absolute value of deviation output from the deviation measurement unit 19.

The multiplier 21 multiplies the detected correlation value (211) output by the maximum value detector 18 and the correction coefficient output by the correction coefficient ROM 20 and outputs the result to the adder 15 via the switch 14. The adder 15 corrects the correlation electric power value of the delay profile by adding the value received from the multiplier 21 and the correlation electric power value of corresponding address shown in Table 1 and outputs the result to the electric power cyclic integral memory 16. With the above-explained process, the delay profile used for the second path detection shown in FIG. 7 is corrected, and a delay profile to be used for the third path detection shown in FIG. 8 will be produced.

The third path detection is performed with the delay profile shown in FIG. 8. Namely, the maximum value detector 18 reads a delay profile when the third path is detected from the electric power cyclic integral memory 16 and selects a sampling point whose correlation electric power value is the greatest one (80.2, address 20) to output a delay time of the sampling point as a delay control signal to the RAKE-combination modulator 9. Because a number of sampling paths to be detected is three, it is not necessary to correct a delay profile and a no signal is output to the deviation measurement unit 19 and the multiplier 21. As above-explained, the RAKE-combination path timing detector 8 outputs a delay time of sampling point of address 29 selected as the first path, a delay time of sampling point of address 20 selected as the second path and a delay time of sampling point of address 20 selected as the third path, as a delay control signal. Thereby, a path signal to be inverse-spread by the RAKE-combination modulator 9 will be specified.

Figure 9:
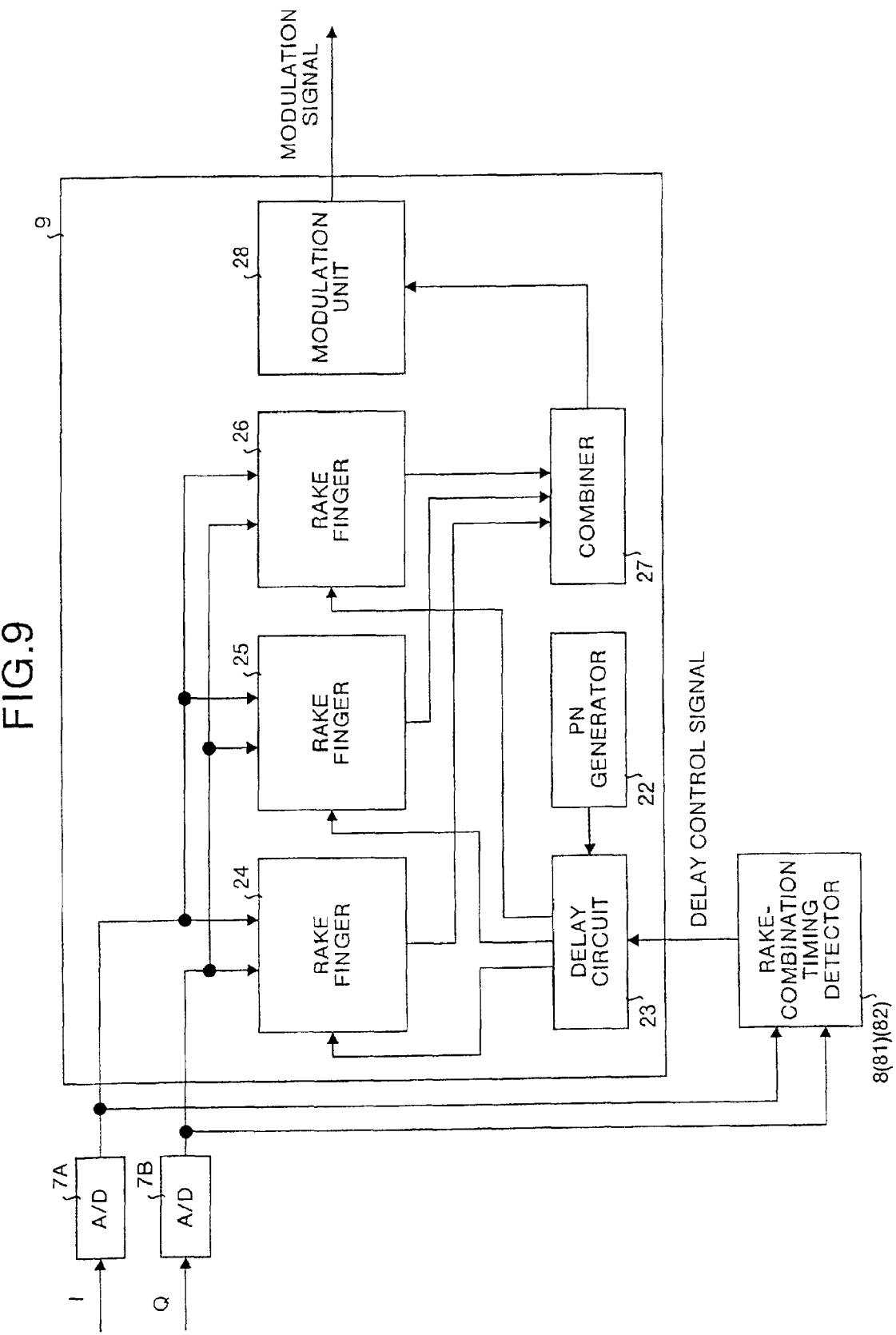
FIG. 9 is a block diagram showing a construction of a RAKE-combination modulator.

The RAKE-combination modulator 9 will be explained in more detail. FIG. 9 is a block diagram showing the construction of the RAKE-combination modulator 9. In FIG. 9, reference numeral 22 denotes a PN generator, reference numeral 23 denotes a delay circuit, reference numerals 24, 25, and 26 denote RAKE-fingers, reference numeral 27 denotes a combiner, and reference numeral 28 denotes a modulation unit. The RAKE-combination modulator 9 shown in FIG. 9 inverse-spreads I-channel and Q-channel digital data input from the A–D converters 7A and 7B according to a delay time of each path output from the RAKE-combination path timing detector 8. The signals of path having been inverse-spread are respectively combined and information-modulated.

The construction and the operation of the RAKE-combination modulator 9 shown in FIG. 9 will now be explained. The PN generator 22 generates a PN sequence which as the inverse-spread code and output the generated PN sequence to the delay circuit 23. The RAKE-combination path timing detector 8 outputs a delay control signal to the delay circuit 23. The delay circuit 23 delays the PN sequence input from the PN generator 22 based on the delay control signal input from the RAKE-combination path timing detector 8 in accordance to a delay time of each path. The delay circuit 23 outputs each of PN sequences delayed in accordance to the delay times of the first, second, and third path signals to the RAKE-fingers 24, 25, and 26, respectively.

Each of the RAKE-fingers 24, 25, and 26 receives I-channel and Q-channel digital signals from the A–D converters 7A and 7B. The RAKE-finger 24 uses PN-sequence delayed in correspondence to a delay time of the first path signal to inverse-spread the I-channel and Q-channel digital signals. There by only the first path signal may be separated from a plurality of path signals included in I-channel and Q-channel digital signals. In the same manner, the RAKE-fingers 25 and 26, respectively uses PN-sequence delayed in correspondence to a delay time of each of the second and the third path signals to inverse-spread I-channel and Q-channel digital signals. There by the second and third path signals may be separated from a plurality of path signals included in the I-channel and Q-channel digital signals. The RAKE-fingers 24, 25, and 26 respectively outputs the first, second, and third path signals being inverse-spread to the combiner 27. The combiner 27 RAKE-combines the first, second, and third path signals output from the RAKE-fingers 24, 25, and 26 by weighting. Level of the amplitude of the signal is used as a weight. The combiner 27 outputs the RAKE-combined signal to the modulation unit 28. The modulation unit 28 information-modulates the RAKE-combined signal whose ratio of signal to electric power with respect to interference and thermal noise has been improved and outputs the modulation signal to the digital processing circuit 10 shown in FIG. 1.

Figure 10:
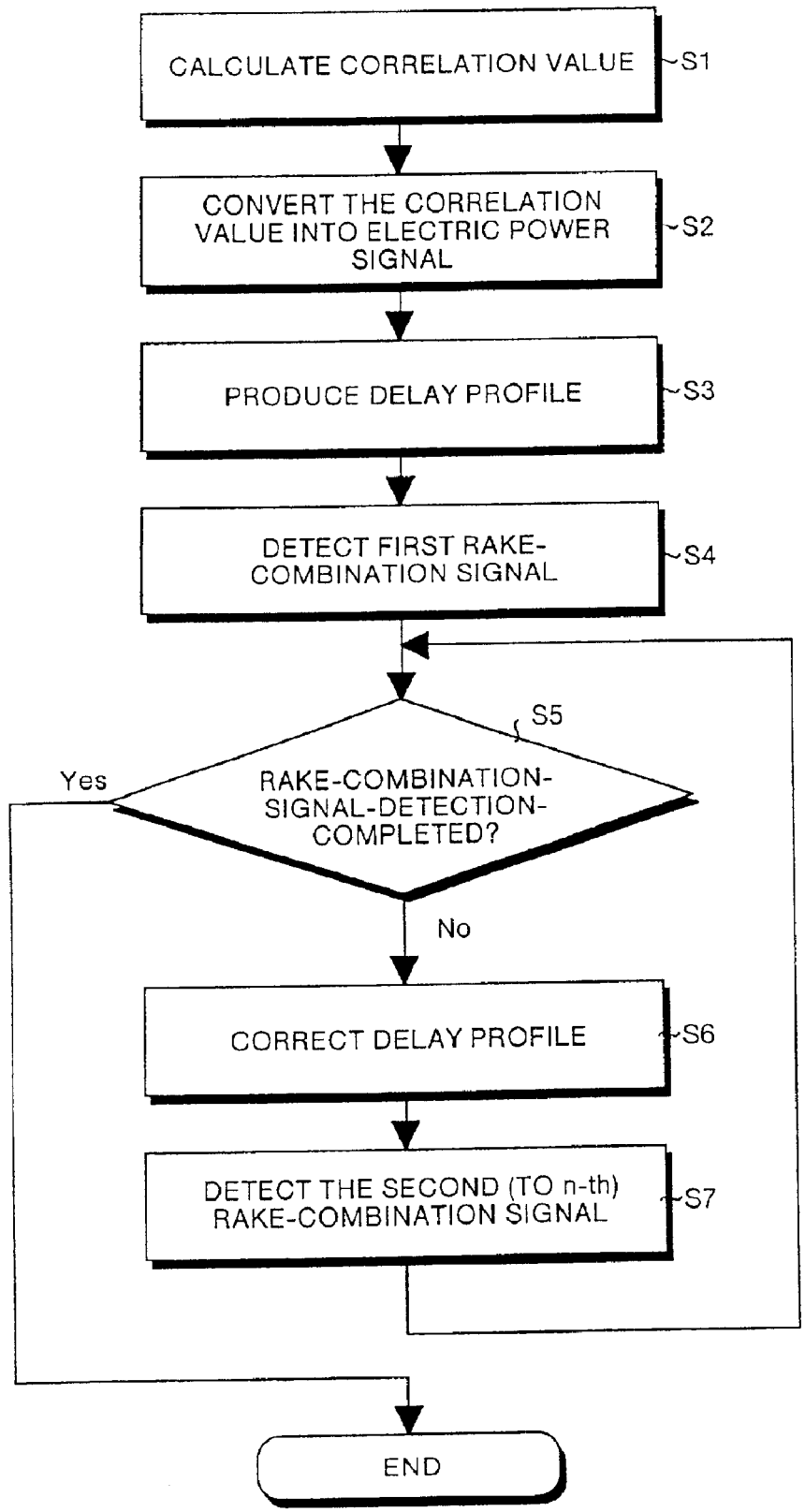
FIG. 10 is a flow chart of a method of detecting RAKE-combination signal in a spread spectrum reception method according to the present invention.

The spread spectrum reception method adopted by the above-explained spread spectrum reception apparatus will now be explained. FIG. 10 is a flow chart for explaining the spread spectrum reception method. At step 1, correlation value is calculated using a reception spread spectrum signal and a reference spread signal. At step 2, the correlation value calculated and electric power cyclic integration step is converted to an electric power. At step 3, a delay profile is produced with a correlation electric power value being converted as an electric power value. Step 4 is a RAKE-combination signal detection step of, of the delay profiles produced at step 3, detecting a maximum signal whose correlation electric power value is the greatest to output a delay time of the detected signal as a delay control signal to the RAKE-combination modulator 9. At step 5, whether the detection of signal for RAKE-combination has completed at step 4 is decided. The number of signals for RAKE-combination is equal to a number of the RAKE fingers 24, 25, and 26 provided in the RAKE-combination modulator 9. Thus, in case of the above-explained spread spectrum reception apparatus, the number of RAKE-combinable signals is three.

When it is decided at step 5 that the detection of signal for RAKE-combination has not been completed, then at step 6, the delay profile is corrected. At step 7, the second RAKE-combination signal is detected from the delay profile corrected at step 6. Step 6 is the second RAKE-combination signal detection step and it is substantially the as same as the first RAKE-combination signal detection step of step 4. After completion of step 7, the system control is returned to step 5 again wherein it is determined whether detection of signal for RAKE-combination has been completed. If sufficient number of RAKE-combinable signals have not been detected, in other words if the number of signals corresponding to the number of RAKE-fingers is not detected, at step 6 the delay profile will be corrected and at step 7 a RAKE-combination signal will be detected with the corrected delay profile. In the above-mentioned example, when three RAKE-combinable signals have been detected the system control is passed to step 5 will pass the process over to Step 8 and complete the RAKE-combination-signal detection process.

Figure 11:
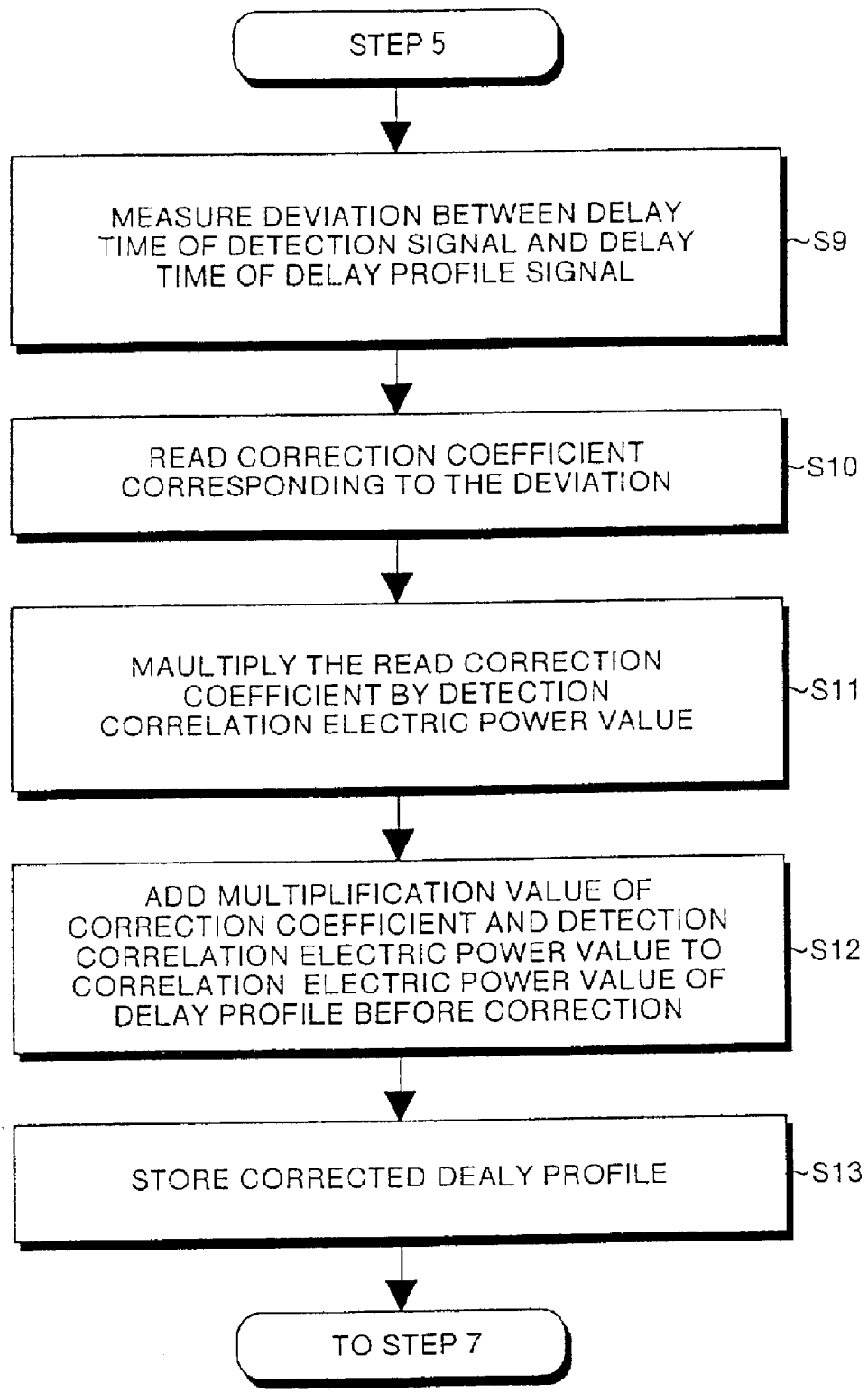
FIG. 11 is a flow chart for explaining about a content of a delay profile correction step.

As explained above, the spread spectrum reception method according to the present invention, is a method of correcting a delay profile if a RAKE-combination signal is detected. Further, the processing performed at step 6 of correcting a delay profile will be explained in more detail with reference to the flow chart shown in FIG. 11. Step 9 shown in FIG. 11 is a deviation measurement step of measuring a deviation between time of signal of pre-corrected delay profile and time of time of detection signal whose correlation electric power value becomes maximum. The deviation measurement unit 19 shown in FIG. 2 performs the processing of step 9. At step 10, a correction coefficient corresponding to a deviation measured in the deviation measurement step 9 is read. The correction coefficient is beforehand calculated with time correlation of interference and thermal noise and stored in the correction coefficient ROM 20. At step 11, the correction coefficient read at step 10 and a correlation electric power value of detection signal are multiplied and the result is sequentially output. The multiplier 21 performs the multiplication at step 11.

At step 12, the result of multiplication obtained step 11 is added to the pre-corrected correlation electric power value and the correlation electric power value of a signals in delay profile is there by corrected. The adder 15 performs the addition at step 12. At step 13, the delay profile is corrected using the correlation electric power value obtained at step 12 and the corrected delay profile is stored. The electric power cyclic integral memory 16 stores the corrected delay profile.

As above-explained, a spread spectrum reception apparatus according to the present invention is provided with the RAKE-combination path timing detector 8 which converts an output of the electric voltage cyclic integrator 12 to an electric power with the electric power converter 13, calculates cyclic integration of electric power with the adder 15 and the electrical power cyclic integral memory 16, and generates a delay profile wherein ratio of signal to electric power is high. Therefore, in comparison with the conventional art, possibility of detection of path proper for RAKE-combination becomes higher and delay time of detection path may be obtained with highly accuracy.

Furthermore, the spread spectrum reception apparatus according to the present invention is provided with the RAKE-combination oath timing detector 8 which performs the above-explained path detection with the above-explained delay profile whose ratio of signal to electric power is higher and corrects the delay profile with a correction coefficient, giving consideration to the interference and thermal noise by each time of path detection. Therefore, a path signal proper, i.e. a signal whose ratio of signal to electric power after RAKE-combination becomes maximum, for RAKE-combination may be selected. Furthermore, a process for correcting a delay profile with a correction coefficient may be performed. Therefore, it is possible to select a path signal such that a ratio of signal to electric power after RAKE-combination becomes maximum. A process for correcting a delay profile with a correction coefficient is performed with a feedback in a same way as a process for performing cyclic integration. Thereby the electric power cyclic integral memory 16 and the adder 15 may be used at not only a delay profile producing mode but also a RAKE-combination path timing detection mode, so that a scale of the circuit may be reduced in comparison with that of another circuit.

Furthermore, as explained above, the number of correction coefficients is substantially equal to 10. Therefore, the correction coefficient ROM 20 is required to store only ten words, i.e. small sized memory is sufficient. Number of data to be corrected does not depend on the length of the delay profile to be observed, i.e. the number is substantially equal to 20 by each single correction. Therefore amount of calculation and electric power consumption is also smaller. The correction coefficient may be a fixed value not depending on the spread code and a propagation environment, so that even if the spread code is changed, there is no necessity for re-calculation. Thus, a scale of the circuit and electric power consumption will be further reduced in comparison with a conventional art.

Further, the spread spectrum reception apparatus according to the present invention is provided with the RAKE-combiration path timing detector 8 which calculates cyclic integration of electric power and sufficiently performing an average calculation when a long period code whose spread code period is longer than a symbol period is used. Thereby, pseudo correlation owing to self-correlation-characteristic is sufficiently averaged, so that an affection of self-correlation is excluded. Therefore, detection of path and correction of delay profile may be performed with high accuracy and ratio of signal to electric power after RAKE-combination may be improved. An amount of process and scale of the circuit may be greatly reduced because the correction of delay profile has only to be performed merely around near detection timing considering over mutual correlation of interference and thermal noise.

Furthermore, the spread spectrum reception apparatus according to the present invention is provided with the RAKE-combination modulator 9 which RAKE-combines a path signal whose ratio of signal to electric power after RAKE-combination becomes maximum, detected by the RAKE-combination path timing detector 8. Thereby a signal electric power with respect to interference and, thermal noise may be greatly improved with RAKE-combination, and a high performance spread spectrum reception apparatus may be obtained.

By using the spread spectrum reception apparatus according to the present invention in, for example, a mobile phone, there is achieved an effect that sensitivity thereof will become better and communication thereby is hard to be cut-off. In a communication system where CDMA system is adopted, by employing the spread spectrum reception apparatus according to the present invention which is highly sensitive, a number of a terminals that can be accommodated within a single cell will be improved, so that radius of the cell may increased. Therefore, number of sets of the local station may be decreased and cost of infrastructure may be decreased.

Furthermore, the spread spectrum reception method according to the present invention produces a delay profile with a correlation electric power value whose correlation value has been converted to electric power, so that a delay profile is produced with high accuracy. Also, a signal proper for RAKE-combination can be detected with high accuracy by detecting a signal for RAKE-combination with this delay profile. The second and the third RAKE-combination signal after the first RAKE-combination signal are detected, a delay profile is corrected with a correction coefficient obtained by time correlation of interference and thermal noise, so that the second and the third RAKE-combination signals can be detected with a high accuracy. As a result, ratio of signal to electric power with respect to interference and thermal noise can be greatly improved by RAKE-combining these RAKE-combination signals.

Figure 12:
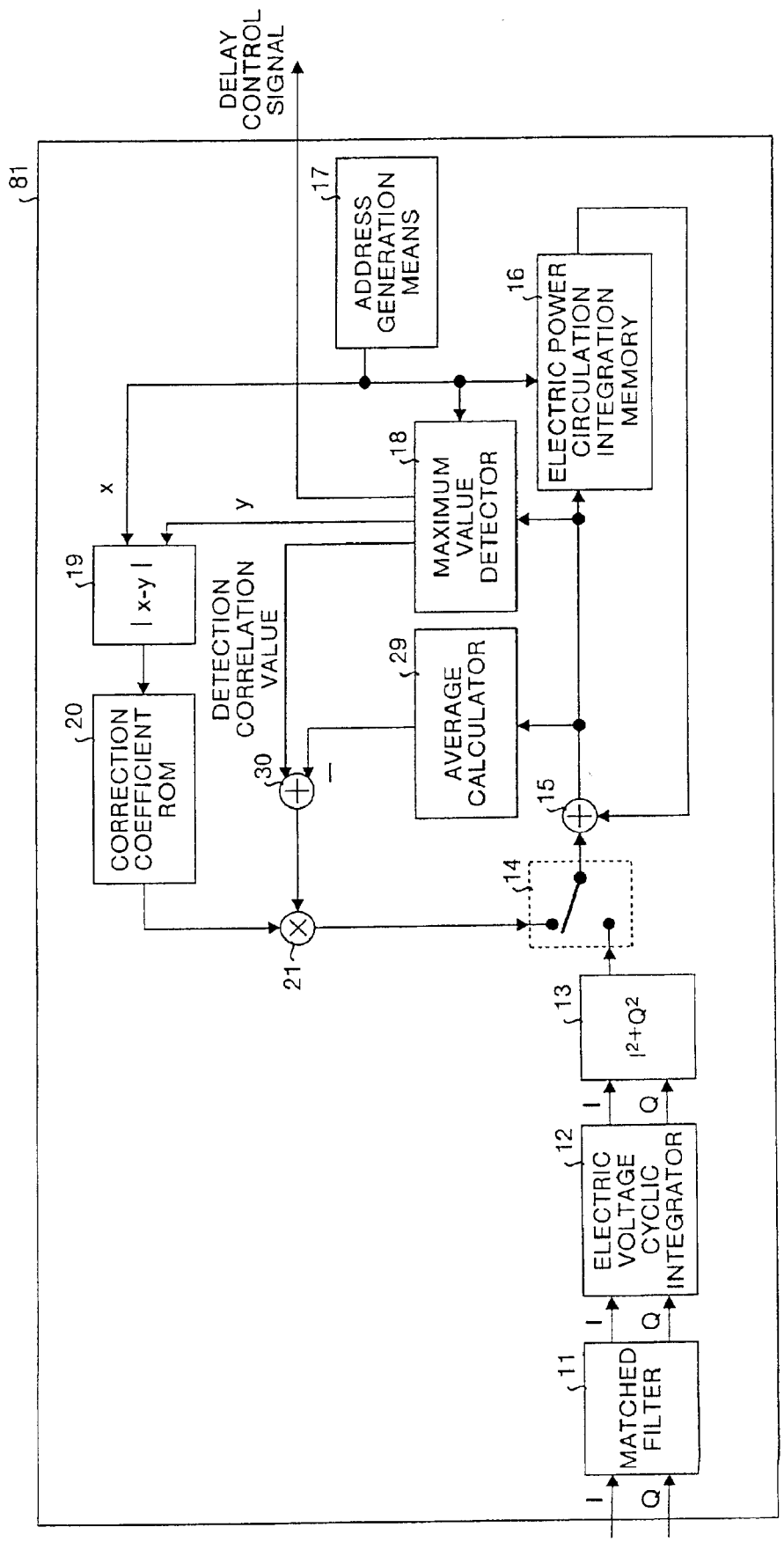
FIG. 12 is a block diagram showing a construction of a RAKE-combination path timing detector provided in a spread spectrum reception apparatus according to a second embodiment of the present invention.

FIG. 12 is a block diagram showing a construction of a RAKE-combination path timing detector provided in the spread spectrum reception apparatus according to the second embodiment of the present invention. In FIG. 12, reference numeral 81 denotes the RAKE-combination path timing detector, reference numeral 29 denotes an average calculator, and reference numeral 30 denotes a second adder. In FIG. 12, same reference numerals are provided to the section that have same or similar as those shown in FIG. 2 and their explanation will be omitted. The RAKE-combination path timing detector 81 provided in the spread spectrum reception apparatus according to the present invention converts an output of the electric voltage cyclic integrator 12 to electric power by the electric power converter 13 and further ratio of signal to electric power will be improved by performing cyclic integration of electric power using the adder 15 and the electric power cyclic integral memory 16. However, it is necessary to consider over affection owing of that the output of the electric voltage cyclic integrator 12 is converted to electric power with the electric power converter 13.

Figure 13:
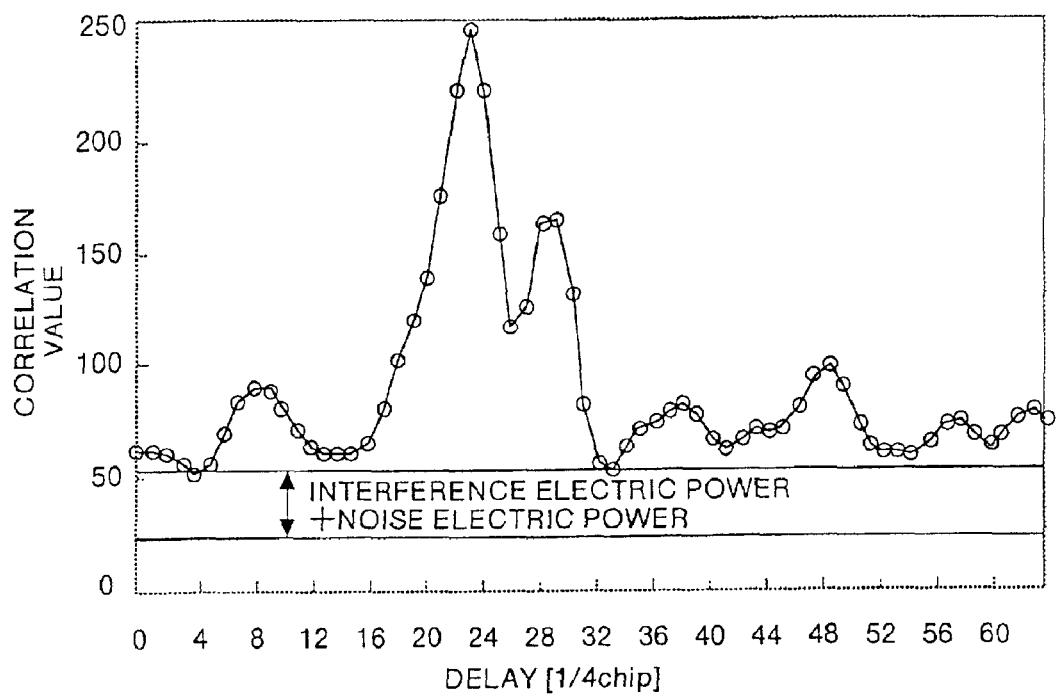
FIG. 13 shows a delay profile wherein a noise electric power and an interference electric power are added.

Namely, the conversion to electric power will have a wave deformed, e.g. there will be no data which has a value of zero or less. Furthermore, band width becomes double and a peak will be sharpen. Furthermore, interference and thermal noise will appear as a DC component, so that interference and thermal noise level must be deducted when a signal level is evaluated. FIG. 13 is a delay profile where interference and thermal noise electric powers are added thereto while cyclic integration is being repeated. In the delay profile shown in FIG. 5, interference electric power, noise electric power, and signal electric power have been observed. If cyclic integration of electric power is repeated from this state, not only the signal electric power but also the interference electric power and the thermal electric power are added thereto, so that all the sampling points in the delay profile as shown in FIG. 13 will move upwardly. Therefore, the interference electric power and the noise electric power must be subtracted from the result of the cyclic integration of electric power in order to correct the delay profile with more accuracy.

The timing of existence of signal electric power can be substantially regarded as interference electric power and noise electric power if an average of the delay profile is calculated because the timing thereof is directed to a smaller portion in a whole of the delay profile, namely a portion where a correlation electric-power is greater. Returning to FIG. 12, the average calculator 29 calculates an average based on a correlation electric power value of the sampling points in the delay profile. Further, the second adder 30 substrates an average calculated by the average calculator 29 from the detected correlation value detected by the maximum value detector 18 to output the subtracted detected correlation value to the multiplier 21. By subtracting an average from a detected correlation value, interference electric power and noise electric power will be eliminated by each time of correction of delay profile. Therefore, delay profile may be produced with high accuracy. Furthermore, a path proper for RAKE-combination may be accurately selected with the delay profile. Furthermore, delay time of the selected path also may be accurately obtained, so that accuracy of RAKE-combination will be improved.

Figure 14:
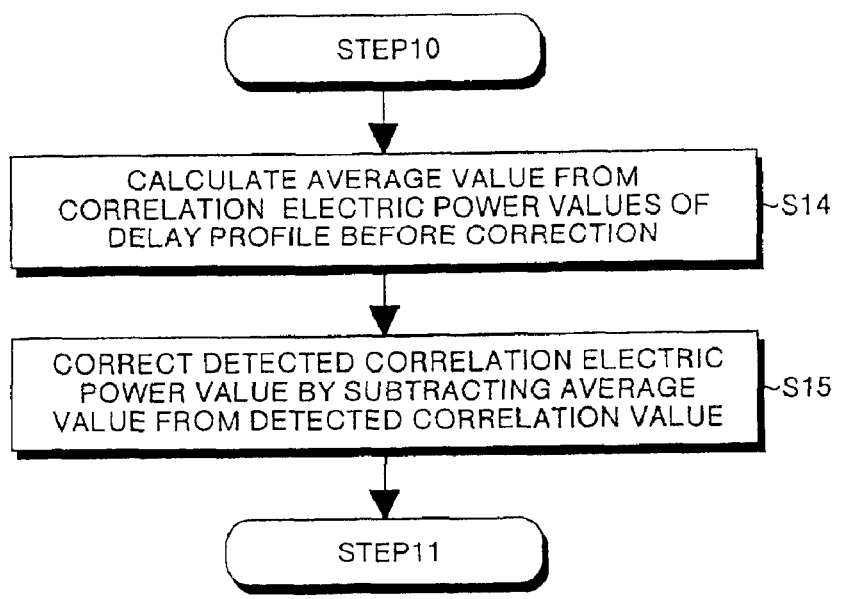
FIG. 14 is a flow chart for explaining about a content of a delay profile correction step.

FIG. 14 is a flow chart for explaining about the delay profile correction step. In FIG. 14, steps 1 to 10 and step 11 and thereafter are the same as those explained with reference to FIG. 10 and FIG. 11. Therefore, explanation about these steps will be omitted. At step 14, an average of the correlation electric power values of the signals in a pre-corrected delay profile are calculated. The average calculator 29 shown in FIG. 12 undertakes the processing at step 14. At step 15, the average calculated at step 14 is subtracting from the correlation electric power value detected at step 4 to correct the detection correlation electric power value. The delay profile may be corrected so as not to include a component of interference electric power and noise electric power therein by performing steps 11 to 13 after the step 14 and step 15.

Figure 15:
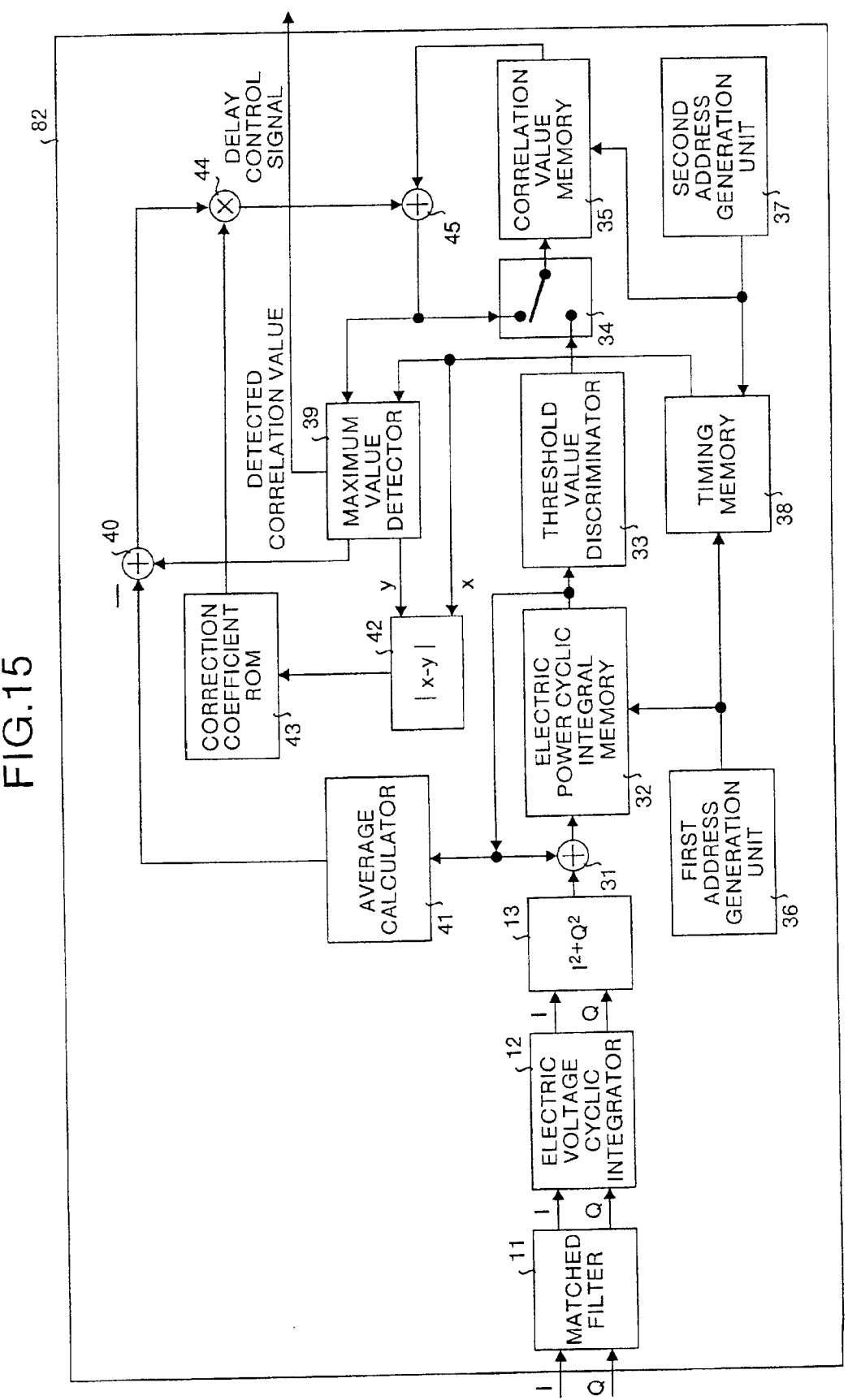
FIG. 15 is a block diagram showing a construction of a RAKE-combination oath timing detector provided in a spread spectrum reception apparatus according to a third embodiment of the present invention.
Figure 16:
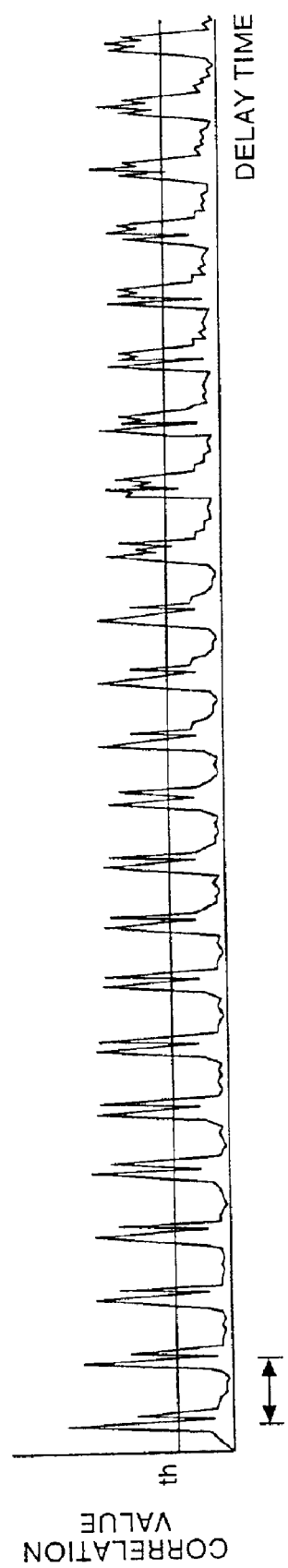
FIG. 16 is one showing an example of continuous measurement of delay profile.

FIG. 15 is a block diagram for showing a construction of the RAKE-combination path timing detector provided in the spread spectrum reception apparatus according to the third embodiment of the present invention. In FIG. 15, reference numeral 82 denotes the RAKE-combination path timing detector, reference numeral 31 denotes a first adder, reference numeral 32 denotes an electric power cyclic integral memory, reference numeral 33 denotes a threshold value discriminator, reference numeral 34 denotes a switch, reference numeral 35 denotes a correlation value memory, reference numeral 36 denotes a first address generation unit, reference numeral 37 denotes a second address generation unit, reference numeral 38 denotes a timing memory, reference numeral 39 denotes a maximum value detector, reference numeral 40 denotes a second adder, reference numeral 41 denotes an average calculator, reference numeral 42 denotes deviation measurement unit, reference numeral 43 denotes a correction coefficient RON, reference numeral 44 denotes a multiplier, and reference numeral 45 denotes a third adder. In FIG. 15, same reference numerals are provided to the section that have same or similar as those shown in FIG. 2 and FIG. 12 and their explanation will be omitted. FIG. 16 is for explaining an example of the continuous measurement of the delay profile.

The measurement time for delay profile shown in FIG. 16 is longer that shown in FIG. 5. Number of sampling points included in the delay profile in FIG. 16 is extraordinarily large. In order to detect a path proper for such RAKE-detection from a delay profile whose measurement time is longer, by eliminating a correlation electric power value being compared with a predetermined threshold value, lying under the threshold one, a number of sampling points to be detected for a path must be decreased.

Construction and operation of the RAKE-combination path timing detector 82 provided in the spread spectrum reception apparatus according to the third embodiment will now be explained. When a delay profile is produced, the switch 34 establishes a signal path between the threshold value discriminator 33 and the correlation value memory 35. In the delay profile production mode, the RAKE-combination path timing detector 82 converts an output of the electric voltage cyclic integrator 12 to electric power with the electrical power converter 13. Further, the adder 31 and the electric power cyclic integral memory 32 perform cyclic integration of electric power to improve the ratio of signal to electric power. The first address generation unit 36 outputs an address to the electric power cyclic integral memory 32. The electric power cyclic integral memory 32 outputs the correlation electric power value to the average calculator 41.

The threshold value discriminator 33 compares the correlation electric power value input from the electric power cyclic integral memory 32 with a predetermined threshold value and outputs a correlation electric power value of the sampling point whose correlation value is greater than a threshold value. The correlation value memory 35 stores the correlation electric power value of the sampling point being greater than a threshold value. The first address generation unit 36 and the second address generation unit generate an address for identifying a sampling point. The first address generation unit 36 outputs an address to the electric power cyclic integral memory 32 and the timing memory 38. The second address generation unit 37 outputs an address to the correlation value memory 35 and the timing memory 38. The timing memory 38 stores the delay time of the sampling point whose correlation electric power value is greater than the threshold value. Thus, a delay profile will be produced and a correlation electric power value and a delay time of sampling point whose correlation electric power value is greater than a threshold value will be specified.

After above process, the RAKE-combination path timing detector 82 performs path-timing-detection for selecting a path proper for RAKE-combination. In a path-timing-detection-mode, the switch 34 establishes a signal path between the third adder 45 and the correlation value memory 35. The maximum value detector 39 reads a delay profile from the correlation value memory 35 and compares the correlation electric power values of each of sampling points to detect a sampling point whose correlation electric power value is maximum and the corresponding correlation electric power value. Further, the maximum value detector 39 outputs a delay time whose correlation electric power value becomes maximum as a delay control signal to the delay circuit 23. Through above process, the first path signal for RAKE-combination will be specified. Further, the maximum value detector 39 outputs a correlation electric power value of detected sampling point as a detected correlation value to the second adder 40. The second adder 40 subtracts an average (interference electric power and noise electric power) calculated from the correlation electric power value of delay profile calculated by the average calculator 41 from the detected correlation value and output the result to the multiplier 44.

The maximum value detector 39 outputs to the deviation measurement unit 42 an address y of sampling point whose correlation electric power value is maximum among the addresses corresponding to each of sampling points input from the timing memory 38. The deviation measurement unit 42 receives the address x of each sampling point from the timing memory 38. The deviation measurement unit 42 calculates an absolute value of deviation between an address of sampling point whose correlation electric power value becomes maximum and an address of the other sampling points to output the deviation to the correction coefficient ROM 43. The correction coefficient ROM 43 outputs a coefficient corresponding to the deviation output from the deviation measurement unit 42. The multiplier 44 multiplies the correction coefficient output from the correction coefficient ROM 43 and the detected correlation value whose averages have been subtracted by the second adder 40 to the third adder 45.

The third adder 45 adds the correlation electric power value of the sampling point in delay profile output from the correlation value memory 35 to the value input from the multiplier 44 and thereby corrects the correlation electric power value of the sampling points whose deviation is below 10. The corrected correlation electric power value is written into the correlation value memory 35 via the switch 34. Thus, the delay profile used for the first path detection is corrected and a delay profile will be produced for using the second path detection. Both, the second and third paths will be detected in the same manner and delay times of sampling points detected as the second or third path will be output as a delay control signal to a delay circuit 23 of the RAKE-combination modulator 9.

Figure 17:
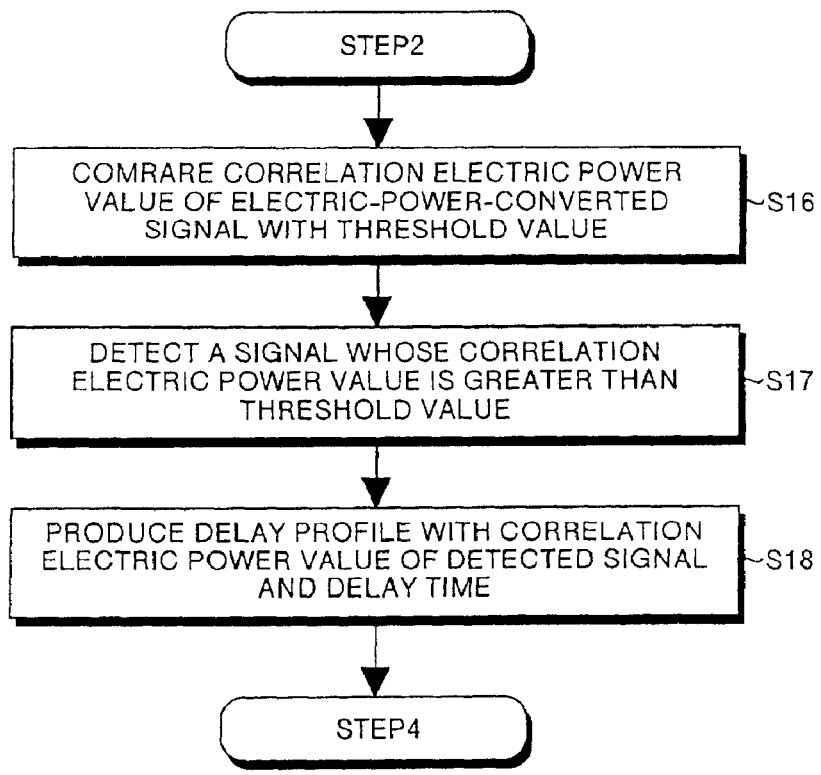
FIG. 17 is a flow chart for explaining about a step for producing a delay profile.
Figure 18:
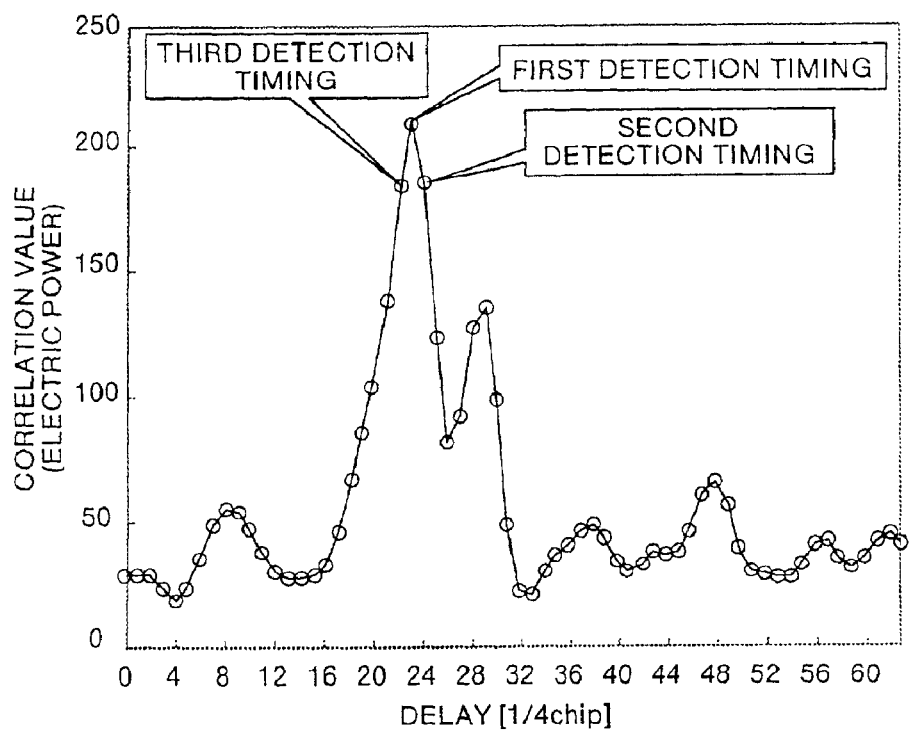
FIG. 18 explains conventional examples of path detection.
Figure 19:
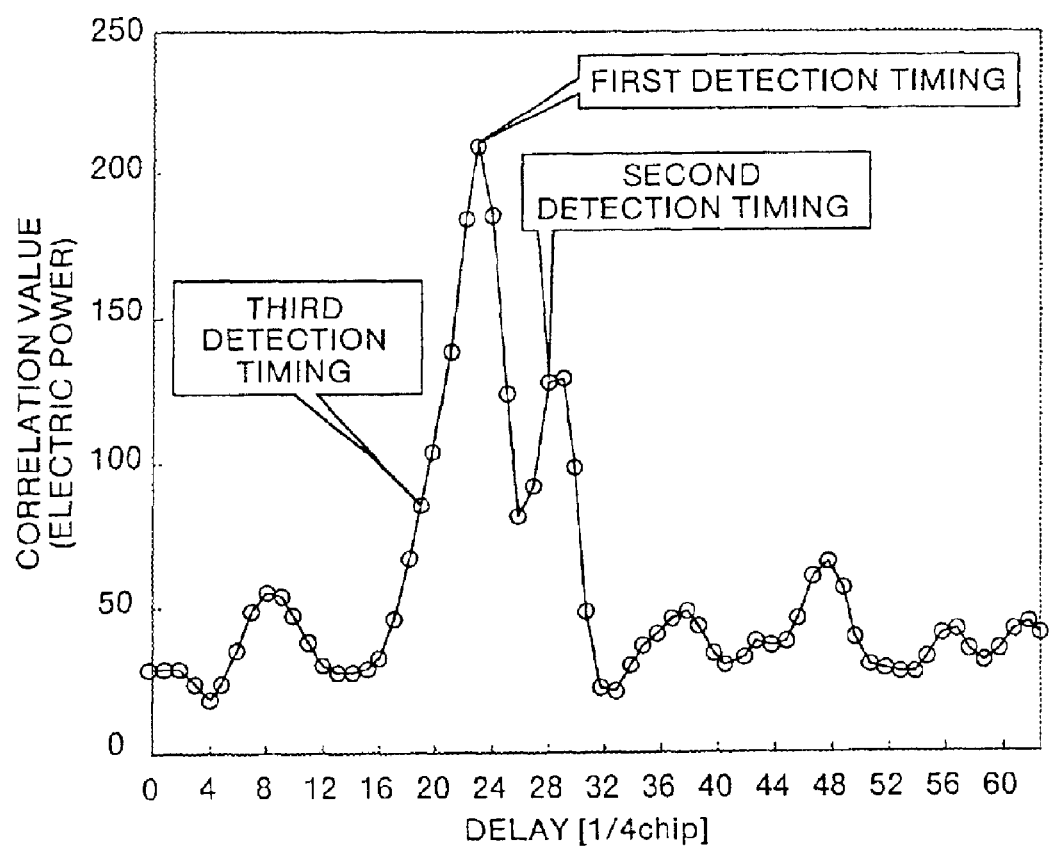
FIG. 19 explains conventional examples of path detection.
Figure 20:
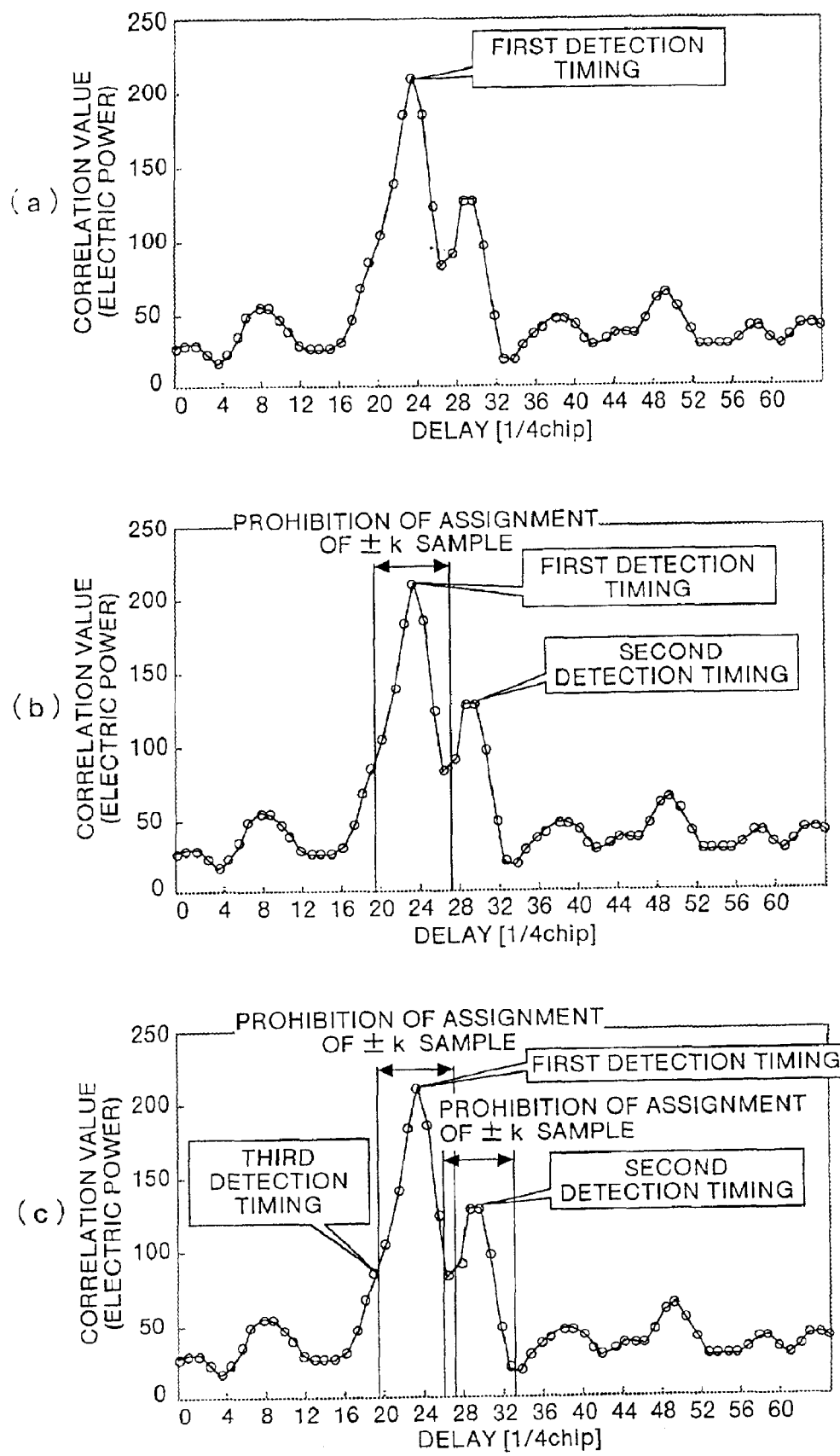
FIG. 20 explains conventional examples of path detection.

Process performed at the delay profile production step will be explained in detail with reference to the flowchart shown in FIG. 17. In FIG. 17 steps 1, 2, and steps 5 onwards are as the same as those shown in FIG. 10 and FIG. 11. Therefore, explanation about these steps will be omitted. At step 16, correlation electric power value of a signal which has been converted into an electric power is compared with a threshold value. At step 17, a signal whose correlation electric power value is greater than the threshold value is detected. The threshold value discriminator 33 shown in FIG. 15 performs the steps 16 and 17. At step 18, a delay profile is produced using the delay time and the correlation electric power value of a signal detected at step 17. The delay profile produced after completion of steps 16 to 18 will be stored in the correlation value memory 35 and the timing memory 38. A RAKE-combination signal may be efficiently detected by the uses of the delay profiles continuously measured for a long time.

Effects achieved by this spread spectrum reception apparatus will be as same as those achieved by the spread spectrum reception apparatuses according to the first and second embodiments. In addition, since a RAKE-combination path timing detector which comprises the threshold value discriminator 33 that compares a correlation electric power value applied with cyclic integration of electric power with a predetermined threshold value, reduction of the number of sampling points to be detected for a path will become possible. Therefore, amount of processing required for path detection can be reduced.

Furthermore, the correlation value memory 35 which stores the correlation electric power value of the sampling point whose correlation electric power value is greater than the threshold value, and the timing memory 38 which stores the delay time of the sampling point whose correlation electric power value is greater than the threshold value are provided. Therefore, it is not necessary to rewrite a content of the electric power cyclic integral memory 32 that stores the delay profile by each time of correction of the delay profile. As a result, it becomes possible to perform cyclic integration with an oblivion coefficient. Possibility of calculation of cyclic integration with the oblivion coefficient will make the data output possible at any interval regardless of time required for integration. Therefore, there is achieved the effect that a freedom order of operation will be increased in comparison with an integral discharging system performing discharging operation that a content of memory is periodically made to be zero and preventing a memory from overflowing.

Furthermore, it is sufficient that the correlation value memory 35 and the timing memory 38 have a memory only for storing the date after discrimination of the threshold value. Therefore, these memories may have a smaller storage capacity than the storage capacity of the electric power cyclic integral memory 32.

The spread spectrum reception apparatus according to the present invention is provided with a RAKE-combination-unit and a RAKE-combination signal detection unit. The RAKE-combination-unit includes a plurality of inverse-spread units each of which inverse-spreads a spread spectrum being signal spread-modulated and transmitted, using an inverse-spread code being delayed for a predetermined time whereby the predetermined delay time signal is separated from the spread spectrum signal; a combining unit which RAKE-combines the signal inverse-spread by the inverse-spread units; and a delay unit which delays the inverse-spread codes supplied to the inverse-spreading units based on a delay control signal input from outside. The RAKE-combination signal detection unit includes a delay profile generation unit which generates a delay profile with a correlation electric power value obtained by converting a correlation value of the spread spectrum signal and a reference spread code into an electric power and the delay time; a correction coefficient storing unit which stores already calculated correction coefficient based on time correlation between interference and thermal noise by each deviation of the delay time; a delay profile correction unit which measures a deviation between a delay time of signal whose correlation electric power value is maximum and a delay time of signal in the delay profile and corrects a correlation electric power value in the delay profile using a multiply value obtained by multiplying a correction coefficient read from the correction coefficient storing unit corresponding to the measured deviation by a maximum electric power value in the delay profile; and a signal detection unit which detects a signal whose correlation electric power value becomes maximum in the delay profile produced by the delay profile producing unit to output a delay time of the detected signal as a first delay control signal and a delay time of signal whose correlation electric power value becomes maximum in the corrected delay profile corrected by the delay profile correction unit as a second delay control signal to the delay unit. As a result, delay time detection and delay profile correction using the delay profile having a high accuracy based on the correlation electric power value whose ratio of signal to electric power is improved. In other words, a path signal proper for RAKE-combination, i.e. a signal whose ration of a signal to an electric power is maximum after RAKE-combination, can be selected.

Further, in the spread spectrum reception apparatus according to the present invention, the delay profile correction unit is provided with an average calculating unit which calculates an average of the correlation electric power value of the delay profile, and the delay profile correction unit multiplies a value obtained by subtracting the average calculated by the average calculating unit from a maximum correlation electric power value in the delay profile by a correction coefficient. As a result, interference electric power and noise electric power can be eliminated every time the delay profile is corrected, considering over affection of electric power conversion.

Further, in the spread spectrum reception apparatus according to the present invention, the delay profile producing unit is provided with a threshold value discriminating unit which compares the correlation electric power value with a predetermined threshold value and decides whether the correlation electric power value is equal to more than the threshold value, and the delay profile producing unit produces a delay profile based on a correlation electric power value that is greater than the threshold value. As a result, the number of sampling points as objects of the path detection can be reduced, so that amount of processing required for path detection process can be reduced.

Further, in the spread spectrum reception apparatus according to the present invention, the delay profile producing unit is provided with a correlation electric power value storing unit which stores the correlation electric power value of a signal for which the threshold value discriminating unit decides that the correlation power value is greater than the threshold value; and a delay time storing unit which stores a delay time of the signal whose correlation electric power value is greater than the threshold value. As a result, required memory capacity can be significantly reduced in comparison with the memory capacity of the electric power cyclic integral memory.

The spread spectrum reception method according to the present invention is a method of detecting a plurality of signals whose correlation value is greater based on a delay profile produced with a correlation value of a reception spread spectrum signal and a reference spread code to use an inverse-spread code delayed corresponding to a delay time the detected signal to RAKE-combine signals separated from the reception spectrum spread signal. This method includes the steps of producing a delay profile based on a correlation electric power value obtained by converting the correlation value to electric power; detecting a delay time of a signal whose correlation electric power value is maximum of the delay profile produced in the delay profile producing step; measuring a deviation between the delay time detected in the first RAKE-combination-signal-detection-step and the delay time of any other signal in the delay profile; correcting the delay profile using a correction coefficient corresponding to the calculated deviation, which correction coefficient is obtained from already stored plurality of correction coefficients calculated from time correlation between interference and noise due to temperature, and the correlation electric power value of a signal detected in the first RAKE-combination-signal-detection-step; and detecting a delay time of signal whose correlation electric power value becomes maximum based on the corrected delay profile in the delay profile correction step. As a result, a RAKE-combination signal other than the first RAKE-combination-signal is detected with the delay profile corrected using a correction coefficient considering over interference and thermal noise, so that the second and third RAKE-combination signal can be detected with high accuracy.

Further, in the spread spectrum reception method according to the present invention, at the delay profile correction step, an average of correlation electric power values of the delay profile is calculated and the correlation electric power value of the delay profile is corrected using the calculated average. As a result, a delay profile can be corrected so as not to include any component of interference electric power and noise electric power.

Further, in the spread spectrum reception method according to the present invention, at the delay profile producing step, the correlation electric power value is compared with a predetermined threshold value and a delay profile is produced based on a signal whose correlation electric power value is greater than the threshold value. As a result, a RAKE-combination signal can be efficiently detected even if the delay profile is the one obtained by continuous measurement for a long time.

INDUSTRIAL APPLICABILITY

As above-mentioned, the spread spectrum reception apparatus and the spread spectrum reception method are beneficial for communication in DS-CDMA system and particularly adaptable for mobile communication terminals to be used under mobile communication environment which is easy to be affected by the reflection, diffraction, and scattering, etc.

What is claimed is:

1. A spread spectrum reception apparatus comprising:
a RAKE-combination-unit; and
a RAKE-combination signal detection unit, wherein
said RAKE-combination-unit includes,
a plurality of inverse-spread units, each of which inverse-spreads a spread spectrum signal that is spread-modulated and transmitted, said plurality of inverse-spread units configured to use an inverse-spread code that is delayed for a predetermined time, wherein a predetermined time-delayed signal is separated in time from the spread spectrum signal, a combining unit which RAKE-combines respective signals that are inverse-spread by said plurality of inverse-spread units, and a delay unit which delays the inverse-spread codes supplied to said inverse-spread units based on a delay control signal input from outside, and said RAKE-combination signal detection unit includes, a delay profile generation unit which generates a delay profile with a correlation electric power value obtained by converting a correlation value of the spread spectrum signal and a reference spread code into an electric power value and an associated delay time, a correction coefficient storing unit which stores already calculated correction coefficient based on time correlation between interference and thermal noise by each deviation of the delay time, a delay profile correction unit which measures a deviation between a delay time of a signal whose correlation electric power value is maximum and a delay time of a signal in the delay profile and corrects a correlation electric power value in the delay profile using a result obtained by multiplying a correction coefficient read from said correction coefficient storing unit corresponding to the measured deviation by a maximum electric power value in the delay profile; and a signal detection unit which detects a signal whose correlation electric power value becomes maximum in the delay profile generated by said delay profile generation unit and outputs delay time of a detected signal as a first delay control signal and a delay time of a signal whose correlation electric power value becomes maximum in a corrected delay profile corrected by said delay profile correction unit as a second delay control signal to the delay unit.

2. The spread spectrum reception apparatus according to claim 1, wherein said delay profile correction unit includes an average calculating unit which calculates an average of the correlation electric power value of the delay profile, and said delay profile correction unit multiplies a value obtained by subtracting the average calculated by said average calculating unit from a maximum correlation electric power value in the delay profile by a correction coefficient.

3. The spread spectrum reception apparatus according to claim 1, wherein said delay profile generation unit comprises:

a threshold value discriminating unit which compares the correlation electric power value with a predetermined threshold value and decides whether the correlation electric power value is equal to or more than the predetermined threshold value, and said delay profile generation unit is configured to generate a delay profile based on a correlation electric power value that is greater than the predetermined threshold value.

4. The spread spectrum reception apparatus according to claim 3, wherein said delay profile generation unit comprises:

a correlation electric power value storing unit which stores the correlation electric power value of a signal for which the threshold value discriminating unit decides that the correlation power value is greater than the predetermined threshold value; and a delay time storing unit which stores a delay time of a signal whose correlation electric power value is greater than the threshold value.

5. A spread spectrum reception method of detecting a plurality of signals whose correlation value is greater based on a delay profile produced with a correlation value of a reception spread spectrum signal and a reference spread code, comprising:

producing a delay profile based on a correlation electric power value obtained by converting the correlation value to electric power;

firstly detecting a delay time of a signal whose correlation electric power value is a maximum of the delay profile produced in the producing step;

measuring a deviation between the delay time detected in the first detecting step and a delay time of any other signal in the delay profile;

correcting the delay profile using a correction coefficient corresponding to a calculated deviation, said correction coefficient is obtained from already stored plurality of correction coefficients calculated from time correlation between interference and noise due to temperature, and the correlation electric power value of a signal detected in the detecting step; and secondly detecting a delay time of a signal whose correlation electric power value becomes a maximum based on a corrected delay profile in the correcting step.

6. The spread spectrum reception method according to claim 5, wherein the correcting step further comprises:

calculating an average of correlation electric power values of the delay profile; and correcting the correlation electric power value of the delay profile using the calculated average.

7. The spread spectrum reception method according to claim 5, wherein the producing step further comprises:

comparing the correlation electric power value with a predetermined threshold value; and producing a delay profile based on a signal whose correlation electric power value is greater than the threshold value.

* * * * *